(12) United States Patent
Takemori et al.

(10) Patent No.: US 11,201,736 B2
(45) Date of Patent: Dec. 14, 2021

(54) MANAGEMENT DEVICE, MANAGEMENT SYSTEM, KEY GENERATION DEVICE, KEY GENERATION SYSTEM, KEY MANAGEMENT SYSTEM, VEHICLE, MANAGEMENT METHOD, KEY GENERATION METHOD, AND COMPUTER PROGRAM

(71) Applicant: KDDI CORPORATION, Tokyo (JP)

(72) Inventors: Keisuke Takemori, Tokyo (JP); Hideaki Kawabata, Tokyo (JP); Yasuaki Kobayashi, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 169 days.

(21) Appl. No.: 15/747,992

(22) PCT Filed: Aug. 4, 2016

(86) PCT No.: PCT/JP2016/072926
§ 371 (c)(1),
(2) Date: Jan. 26, 2018

(87) PCT Pub. No.: WO2017/022821
PCT Pub. Date: Feb. 9, 2017

(65) Prior Publication Data
US 2018/0227120 A1 Aug. 9, 2018

(30) Foreign Application Priority Data

Aug. 5, 2015 (JP) .............................. JP2015-155376
Dec. 8, 2015 (JP) .............................. JP2015-239428

(51) Int. Cl.
*H04L 9/00* (2006.01)
*H04L 9/08* (2006.01)
(Continued)

(52) U.S. Cl.
CPC ............ *H04L 9/0861* (2013.01); *G06F 21/44* (2013.01); *G06F 21/45* (2013.01); *H04L 9/0819* (2013.01);
(Continued)

(58) Field of Classification Search
CPC .............................. H04L 9/0861; G06F 21/44
(Continued)

(56) References Cited

U.S. PATENT DOCUMENTS 9,132,790 B2   9/2015   Miyake
2010/0135498 A1   6/2010   Long et al.
(Continued)

FOREIGN PATENT DOCUMENTS

AU   2008299852 B2   4/2014
CN   103685214 A   3/2014
(Continued)

OTHER PUBLICATIONS

Miller et al., "Adventures in Automobile Networks and Control Units", DEF CON 21, Aug. 2013.
(Continued)

*Primary Examiner* — Jeffrey C Pwu
*Assistant Examiner* — Samuel Ambaye
(74) *Attorney, Agent, or Firm* — Greenblum & Bernstein, P.L.C.

(57) ABSTRACT

A management device installed in a vehicle includes a master key storing part configured to share the master key that is used to generate an initial key held by an ECU together with an identifier of the ECU; a communication part configured to communicate with the ECU; a key generation part configured to generate the initial key of the ECU by use of the master key stored on the master key storing part and the identifier of the ECU received from the ECU via the communication part; and an initial key storing part config-
(Continued)

ured to store the initial key of the ECU that is generated by the key generation part in connection with the identifier of the ECU.

8 Claims, 15 Drawing Sheets

(51) Int. Cl.
　　　*G06F 21/44*　　　(2013.01)
　　　*H04L 9/14*　　　(2006.01)
　　　*G06F 21/45*　　　(2013.01)
　　　*H04L 29/08*　　　(2006.01)
(52) U.S. Cl.
　　　CPC .......... *H04L 9/0866* (2013.01); *H04L 9/0894* (2013.01); *H04L 9/14* (2013.01); *H04L 67/12* (2013.01); *H04L 2209/84* (2013.01)
(58) Field of Classification Search
　　　USPC ............................................ 713/171; 380/44
　　　See application file for complete search history.

(56) References Cited

U.S. PATENT DOCUMENTS

| | | | | |
|---|---|---|---|---|
| 2013/0067220 A1* | 3/2013 | Ando | ................. | H04L 67/12 713/156 |
| 2013/0111582 A1* | 5/2013 | Forest | ................. | G06F 21/44 726/19 |
| 2013/0301829 A1* | 11/2013 | Kawamura | ........... | H04L 9/0869 380/44 |
| 2014/0068280 A1* | 3/2014 | Yoshimi | .................. | G09C 1/00 713/194 |
| 2014/0114497 A1* | 4/2014 | Miyake | .................... | H04L 9/32 701/1 |
| 2015/0033019 A1* | 1/2015 | Oguma | ................. | H04L 9/0822 713/171 |
| 2016/0099806 A1* | 4/2016 | Racklyeft | ............. | H04W 12/08 380/281 |

FOREIGN PATENT DOCUMENTS

| | | |
|---|---|---|
| EP | 2663018 A1 | 11/2013 |
| JP | 2002-274293 A | 9/2002 |
| JP | 2011-020475 A | 2/2011 |
| JP | 2011-228777 A | 11/2011 |
| JP | 2013-017140 A | 1/2013 |
| JP | 2014-053675 A | 3/2014 |
| JP | 2017-034646 A | 2/2017 |

OTHER PUBLICATIONS

Takada et al., "Suggestion for Intensifying Information Security for Vehicle-Embedded System", Sep. 2013. Internet URL: https://www.ipa.go.jp/files/000034668.pdf.
"Trusted Computing Group" webpage printout: http://www.trustedcomputinggroup.org/ printed on Mar. 22, 2017.
Schleiffer et al., "Secure Key Management—A Key Feature for Modern Vehicle Electronics", Apr. 16, 2013, pp. 1-8, Internet URL: http://weimerskirch.org/publcations.html.
Desmedt et al., "Public-Key Systems Based On the Difficulty of Tampering", Lecture Notes in Computer Science, Aug. 4, 1987, pp. 111-117, vol. 263.
Takemori, "In-vehicle Network Security Using Secure Elements: Discussion of Security Technologies", IEICE Technical Report, Mar. 2, 2015, pp. 73-78, vol. 114, No. 508.
Menezes et al., "Handbook of Applied Cryptography", CRC Press, 1997, pp. 234, 235.
International Search Repor in WIPO Patent Application No. PCT/JP2016/072926, dated Nov. 1, 2016.
Office Action issued in Japanese family member Patent Appl. No. 2015-239428, dated Apr. 4, 2017.
Office Action issued in Japan family member Patent Appl. No. 2017-137200, dated Apr. 24, 2018, along with an English translation thereof.
Search Report issued in European Patent Office (EPO) Patent Application No. 16833100.7, dated Feb. 14, 2019.
India Office Action, dated Jul. 31, 2020 by the India Patent Office, in the India Application No. 201847003981.
Office Action issued in China family member Patent Appl. No. 201680045405.4, dated Mar. 18, 2020.

* cited by examiner

MANAGEMENT DEVICE, MANAGEMENT SYSTEM, KEY GENERATION DEVICE, KEY GENERATION SYSTEM, KEY MANAGEMENT SYSTEM, VEHICLE, MANAGEMENT METHOD, KEY GENERATION METHOD, AND COMPUTER PROGRAM

TECHNICAL FIELD

The present invention relates to a management device, a management system, a key generation device, a key generation system, a key management system, a vehicle, a management method, a key generation method, and a computer program.

The present application claims the benefit of priority on Japanese Patent Application No. 2015-155376 filed on Aug. 5, 2015 and Japanese Patent Application No. 2015-239428 filed on Dec. 8, 2015, the subject matters of which are hereby incorporated herein by reference.

BACKGROUND ART

Recently, automobiles equipped with ECUs (Electronic Control Units) have been designed to achieve engine control functions using ECUs. The ECU is a type of computer for achieving desired functions according to computer programs. Normally, computer programs for the ECUs already installed in automobiles are updated in ordinal auto-repair shops on inspection or periodic inspection of automobiles.

Conventionally, computer programs for the ECUs are updated such that an operator connects a diagnosis terminal dedicated to maintenance to a diagnosis port, referring to as an OBD (On-Board Diagnostics) port for each automobile, so as to install updating programs and change settings of data via the diagnosis terminal. For example, Non-Patent Literatures 1, 2 disclose techniques regarding the security of on-vehicle control systems.

CITATION LIST

Non-Patent Literature

Non-Patent Literature 1: C. Miller, C. Valasek, "Adventures in Automobile Networks and Control Units". DEF CON 21, August 2013

Non-Patent Literature 2: Hiroaki Takada. Tsutomu Matsumoto, "Suggestion Regarding Information Security Enhancement of On-Vehicle Embedded System", September 2013, Internet <URL: https://www.ipa.go.jp/files/000034668.pdf>

Non-Patent Literature 3: Trusted Computing Group. Internet <URL: http://www.trustedcomputinggroup.org/>

SUMMARY OF INVENTION

Technical Problem

The aforementioned Non-Patent Literatures 1, 2 fail to disclose any means for improving the security of on-vehicle control systems. For this reason, it is preferable to improve the reliability of data applications for computer programs installed in on-vehicle computers such as ECUs installed in automobiles or vehicles.

For example, it is possible to improve the protection quality of on-vehicle computer system by way of mutual authentication with counterpart devices for exchanging data using keys held by ECUs after the ECUs are activated. In addition, it is possible to verify the correctness of data being exchanged between the ECUs by use of keys held by the ECUs. Moreover, it is possible to inspect computer programs or data used for the ECUs such that computer programs or data used for the ECUs having attached electronic signatures are delivered to a management device for each automobile, and then electronic signatures attached to the delivered data are checked using keys held by the management device. Herein, it is a problem about the safety of keys as to how to realize management and updating of keys held by automobiles.

The present invention is made in consideration of the aforementioned circumstances, and therefore the present invention aims to provide a management device, a management system, a key generation device, a key generation system, a key management system, a vehicle, a management method, a key generation method, and a computer program, which can be contributed to management and updating of keys held by automobiles or vehicles.

Solution to Problem (1) According to one aspect of the present invention, a management device includes a master key storing part configured to share the master key that is used to generate the initial key held by an on-board computer mounted on a vehicle together with an identifier of the on-board computer; a communication part configured to communicate with the on-board computer; a key generation part configured to generate the initial key of the on-board computer by use of the master key stored on the master key storing part and the identifier of the on-board computer received from the on-board computer via the communication part; and an initial key storing part configured to store the initial key of the on-board computer that is generated by the key generation part in connection with the identifier of the on-board computer.

(2) According to one aspect of the present invention, a management system includes a management device and a management server equipment configured to communicate with the management device through a wireless communication network. The management server equipment includes a storage medium configured to share the master key that is used to generate an initial key held by an on-board computer mounted on a vehicle together with an identifier of the on-board computer; a key generation part configured to generate the initial key of the on-board computer by use of the master key stored on the storage medium and an identifier of the on-board computer that is received via the management device; and a communication part configured to transmit the initial key of the on-board computer that is generated by the key generation part together with the identifier of the on-board computer. The management device includes a wireless communication part configured to transmit the identifier of the on-board computer to the management server equipment through the wireless communication network and to receive a pair of the initial key of the on-board computer and the identifier of the on-board computer from the management server equipment through the wireless communication network; and a key storage medium configured to store a pair of the initial key of the on-board computer and the identifier of the on-board computer, which are received from the management server equipment via the wireless communication part.

(3) According to one aspect of the present invention, a management device includes a wireless communication part configured to transmit an identifier of an on-board computer, which is used to generate an initial key held by the on-board computer mounted on a vehicle together with a master key, to a management server equipment sharing the master key and to receive a pair of the initial key of the on-board computer and the identifier of the on-board computer from the management server equipment through a wireless communication network; and a key storage medium configured to store a pair of the initial key of the on-board computer and the identifier of the on-board computer, which are received from the management server equipment with the wireless communication part.

(4) According to one aspect of the present invention, a key generation device includes a key storage medium configured to share a plurality of master keys that are used to generate an initial key held by an on-board computer mounted on a vehicle together with an identifier of the on-board computer, and therefore the initial key of the on-board computer is generated using a plurality of master keys stored on the key storage medium and the identifier of the on-board computer supplied from the on-board computer.

(5) According to one aspect of the present invention, a key management system includes a key generation device of (4); and a key storage medium configured to store an initial key of an on-board computer generated by the key generation device in connection with an identifier of the on-board computer.

(6) According to one aspect of the present invention, a key generation system includes a first value generating device and an initial key generating device. The first value generating device includes a first key storing part configured to share the first master key within first and second master keys which are used to generate an initial key held by an on-board computer mounted on a vehicle together with an identifier of the on-board computer, and therefore the first value generating device generates a first value used to generate the initial key of the on-board computer by use of the first master key stored on the first key storing part and the identifier of the on-board computer supplied from the on-board computer. The initial key generating device includes a second key storing part configured to share the second master key within first and second master keys that are used to generate the initial key held by the on-board computer together with the identifier of the on-board computer, and therefore the initial key generating device generates the initial key of the on-board computer by use of the second master key stored on the second key storing part and the first value supplied from the first value generating device.

(7) In the key generation system of (6) according to one aspect of the invention, the first value generating device and the initial key generating device can be configured of secure elements having different specifications.

(8) In the key generation system of (7) according to one aspect of the invention, the first value generating device and the initial key generating device can be configured of secure elements having different specifications in term of tamper resistance.

(9) According to one aspect of the present invention, a key management system includes a key generation system according to any one of (6) through (8); and a key storage medium configured to store an initial key of an on-board computer generated by the key generation system in connection with an identifier of the on-board computer.

(10) A vehicle according to one aspect of the present invention includes a management device according to any one of (1) through (3).

(11) A vehicle according to one aspect of the present invention includes a key generation device of (4) or a key generation system of (6).

(12) According to one aspect of the present invention, a management method implemented by a management device includes a master key storing step for sharing a master key which is used to generate an initial key held by an on-board computer mounted on a vehicle together with an identifier of the on-board computer; a communication step for receiving the identifier of the on-board computer from the on-board computer; a key generation step for generating the initial key of the on-board computer by use of the maser key stored in the master key storing step and the identifier of the on-board computer received from the on-board computer in the communication step; and an initial key storing step for storing the initial key of the on-board computer generated in the key generation step in connection with the identifier of the on-board computer.

(13) According to one aspect of the present invention, a management method is implemented by a management system including a management device and a management server equipment configured to communicate with the management device through a wireless communication network. The management method includes a storing step for sharing a master key which is used to generate an initial key held by an on-board computer mounted on a vehicle together with an identifier of the on-board computer; a key generation step for generating the initial key of the on-board computer by use of the master key stored in the key storing step and the identifier of the on-board computer received from the management device; a communication step for transmitting to the management device the initial key of the on-board computer generated in the key generation step together with the identifier of the on-board computer; a transmission step for transmitting the identifier of the on-board computer to the management server equipment through the wireless communication network; a reception step for receiving from the management server equipment through the wireless communication network a pair of the initial key of the on-board computer and the identifier of the on-board computer; and a key storing step for storing a pair of the initial key of the on-board computer received from the management server equipment in the reception step and the identifier of the on-board computer.

(14) According to one aspect of the present invention, a key generation method implemented by a key generation device includes a master key storing step for sharing a plurality of master keys that are used to generate an initial key held by an on-board computer mounted on a vehicle together with an identifier of the on-board computer; and a key generation step for generating the identifier of the on-board computer by use of a plurality of master keys stored in the master key storing step and the identifier of the on-board computer supplied from the on-board computer.

(15) According to one aspect of the present invention, a key generation method is implemented by a first value generating device and an initial key generating device. The key generation method includes a first master key storing step for sharing a first master key within first and second master keys that are used to generate an initial key held by an on-board computer mounted on the vehicle together with an identifier of the on-board computer; a first value generating step for generating a first value which is used to generate the initial key of the on-board computer by use of the first master key stored in the first master key storing step and the identifier of the on-board computer supplied from the on-board computer; a second master key storing step for sharing the second master key within the first and second master keys which are used to generate the initial key of the on-board computer together with the identifier of the on-board computer; and an initial key generating step for generating the initial key of the on-board computer by use of the second master key stored in the second master key storing step and the first value supplied from the first value generating device.

(16) According one aspect of the present invention, a non-transitory computer-readable storage medium having stored a computer program causes a computer of a management device to implement a master key storing step for sharing a master key which is used to generate an initial key held by an on-board computer mounted on a vehicle together with an identifier of the on-board computer; a communication step for receiving the identifier of the on-board computer from the on-board computer; a key generation step for generating the initial key of the on-board computer by use of the maser key stored in the master key storing step and the identifier of the on-board computer received from the on-board computer in the communication step; and an initial key storing step for storing the initial key of the on-board computer generated in the key generation step in connection with the identifier of the on-board computer.

(17) According to one aspect of the present invention, a non-transitory computer-readable storage medium having stored a computer program causes a computer of a management server equipment configured to communicate with a management device through a wireless communication network to implement a storing step for sharing a master key which is used to generate an initial key held by an on-board computer mounted on the a vehicle together with an identifier of the on-board computer; a key generation step for generating the initial key of the on-board computer by use of the master key stored in the key storing step and the identifier of the on-board computer received from the management device; and a communication step for transmitting to the management device the initial key of the on-board computer generated in the key generation step together with the identifier of the on-board computer.

(18) According to one aspect of the present invention, a non-transitory computer-readable storage medium having stored a computer program causes a computer of a management device to implement a transmission step for transmitting the identifier of the on-board computer, which is used to generate an initial key held by an on-board computer mounted on a vehicle together with a master key, to a management server equipment sharing the master key through a wireless communication network; a reception step for receiving from the management server equipment through the wireless communication network a pair of the initial key of the on-board computer and the identifier of the on-board computer; and a key storing step for storing a pair of the initial key of the on-board computer received from the management server equipment in the reception step and the identifier of the on-board computer.

(19) According to one aspect of the present invention, a non-transitory computer-readable storage medium having stored a computer program causes a computer of a key generation device to implement a master key storing step for sharing a plurality of master keys that are used to generate an initial key held by an on-board computer mounted on a vehicle together with an identifier of the on-board computer; and a key generation step for generating the identifier of the on-board computer by use of a plurality of master keys stored in the master key storing step and the identifier of the on-board computer supplied from the on-board computer.

(20) According to one aspect of the present invention, a non-transitory computer-readable storage medium having stored a computer program causes a computer of a first value generating device to implement a first master key storing step for sharing a first master key within first and second master keys that are used to generate an initial key held by an on-board computer mounted on the vehicle together with an identifier of the on-board computer; and a first value generating step for generating a first value which is used to generate the initial key of the on-board computer by use of the first master key stored in the first master key storing step and the identifier of the on-board computer supplied from the on-board computer. The computer program causes a computer of an initial key generating device to implement a second master key storing step for sharing the second master key within the first and second master keys which are used to generate the initial key of the on-board computer together with the identifier of the on-board computer; and an initial key generating step for generating the initial key of the on-board computer by use of the second master key stored in the second master key storing step and the first value supplied from the first value generating device.

Advantageous Effects of Invention

According to the present invention, it is possible to obtain an effect of contributing to management and updating of keys held by automobiles or vehicles.

DESCRIPTION OF EMBODIMENTS

Hereinafter, the present invention will be described by way of embodiments with reference to the drawings. In this connection, the following embodiments mainly refer to an automobile as an example of a vehicle.

First Embodiment

Figure 1:
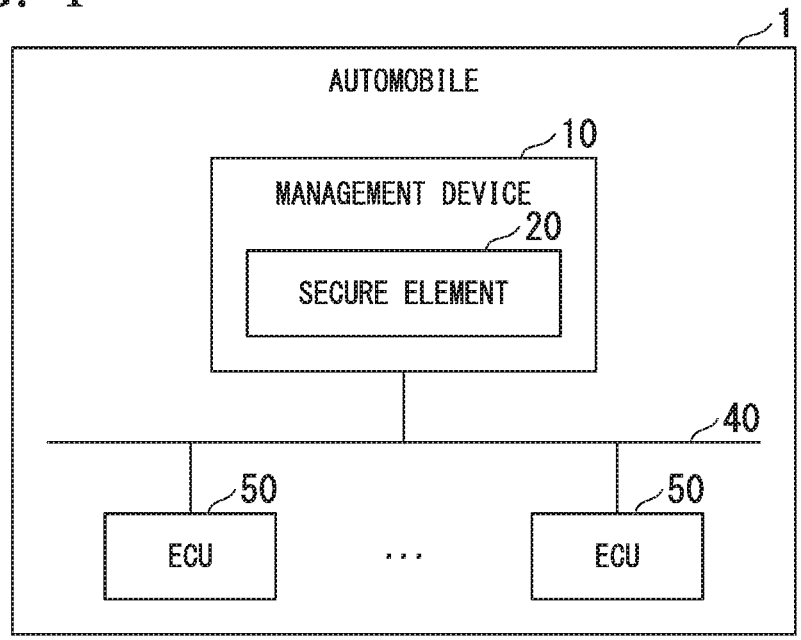
FIG. 1 is a block diagram of an automobile according to the first embodiment.

FIG. 1 is a block diagram of an automobile 1 according to the first embodiment. In FIG. 1, the automobile 1 includes a management device 10 and ECUs 50. The management device 10 is connected to an on-board control network 40. As the on-board control network 40, for example, it is possible to use a CAN (Controller Area Network). The CAN is known as a type of communication network installed in a vehicle. The present embodiment uses a CAN as the on-board control network 40. Various types of the ECUs can be connected to the on-board control network 40. The ECU 50 is an on-board computer installed in the automobile 1. For example, the ECUs 50 are classified into drive ECUs, vehicle ECUs, and safety-control ECUs. The management device 10 exchanges data with the ECUs 50 through the on-board control network 40. Each ECU 50 exchanges data with another ECU 50 through the on-board control network 40. The management device 10 includes a secure element 20.

Figure 2:
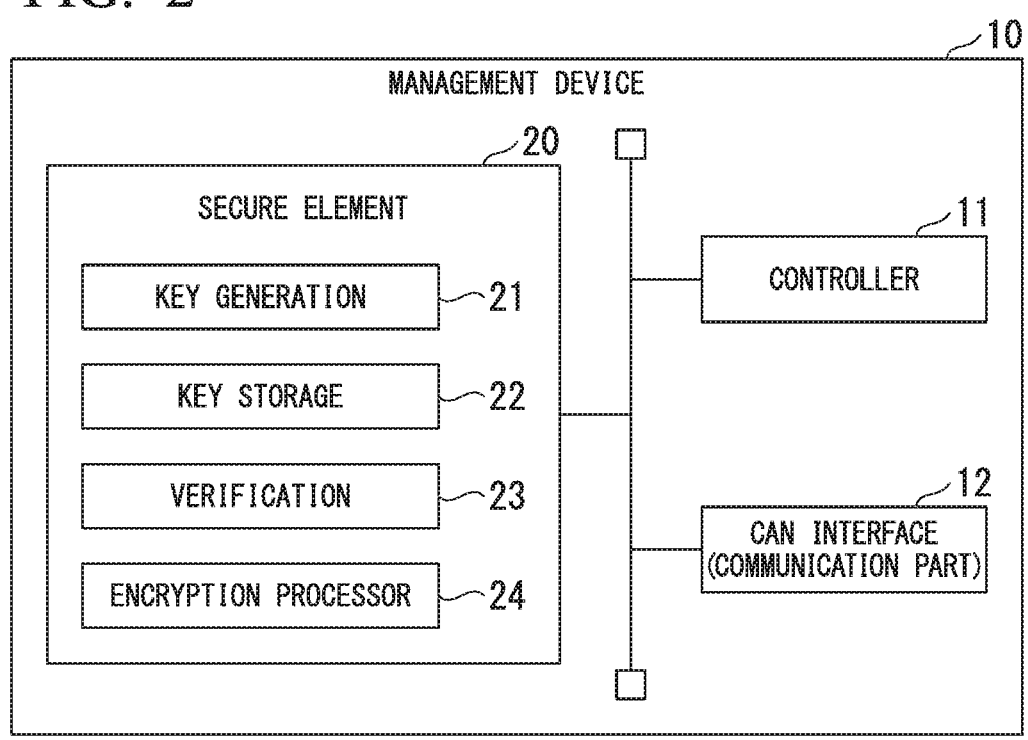
FIG. 2 is a block diagram of a management device according to the first embodiment.

FIG. 2 is a block diagram of the management device 10 according to the first embodiment. In FIG. 2, the management device 10 includes a controller 11, a CAN interface 12, and the secure element 20. Those parts are configured to exchange data therewith. The secure element 20 includes a key generation part 21, a key storage media 22, a verification part 23, and an encryption processor 24.

The controller 11 has a function to control the management device 10. The CAN interface 12 is a communication part configured to communicate with the ECUs 50. The CAN interface 12 is connected to the on-board control network 40, and therefore it is used to exchange data with the ECUs 50. The secure element 20 has tamper resistance.

In the secure element 20, the key generation part 21 generates keys. The key storage media 22 stores keys. The verification part 23 verifies data and counterpart devices to exchange data by use of keys. The encryption processor 24 encrypts data or decrypts encrypted data by use of keys.

Figure 3:
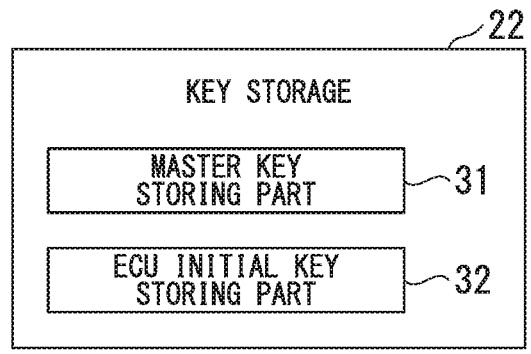
FIG. 3 is a block diagram of a key storage media according to the first embodiment.

FIG. 3 is a block diagram showing an example of the configuration of the key storage media 22 shown in FIG. 2. In FIG. 3, the key storage media 22 includes a master key storing part 31 and an ECU initial key storing part 32.

The master key storing part 31 stores a master key MASTER_KEY. The master key MASTER_KEY is safely written into the secure element 20 of the management device 10 in the manufacturing process of the management device 10. The ECU initial key storing part 32 stores an ECU-initial key in connection with an ECU-identifier.

Hereinafter, a management method for an ECU-initial key will be described in accordance with the first embodiment.

[Stage for Writing ECU-Initial Keys into ECUs]

Figure 4:
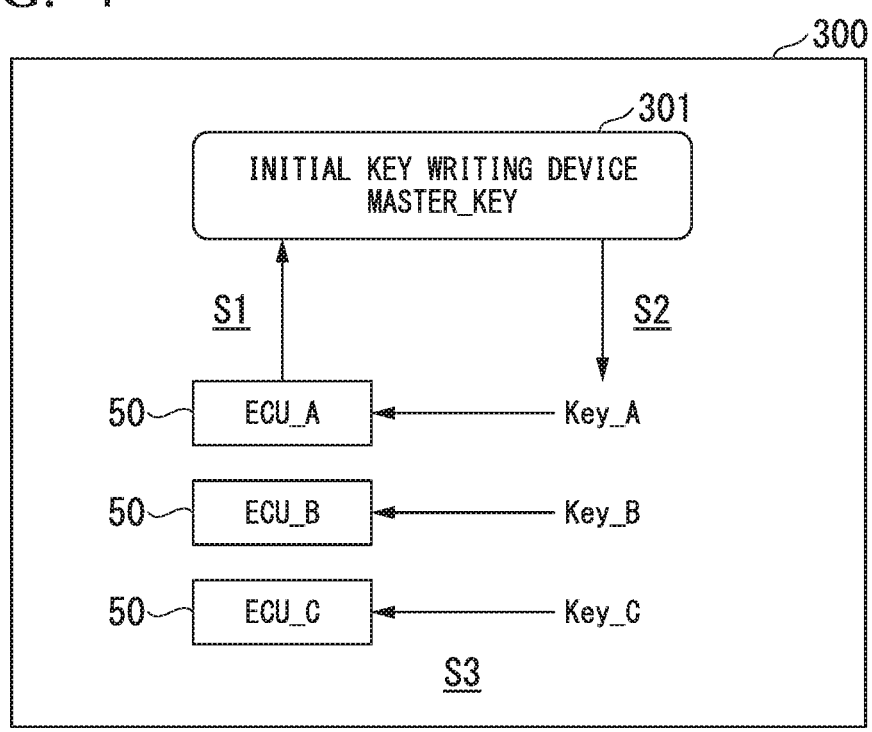
FIG. 4 shows a management method according to the first embodiment.

The stage for writing ECU-initial keys into the ECUs 50 will be described with reference to FIG. 4. FIG. 4 is a schematic diagram illustrating the management method according to the first embodiment.

In FIG. 4, an initial key writing device 301 is places in a room 300 of a manufacturing factory for ECUs 50. The room 300 is a room providing information security. The initial key writing device 301 has the master key MASTER_KEY The master key MASTER_KEY is set to the initial key writing device 301 in advance. The setting of the master key MASTER_KEY to the initial key writing device 301 is carried out safely. The master key MASTER_KEY set to the initial key writing device 301 is identical to the master key MASTER_KEY to be stored on the key storage media 22 of the secure element 20 installed in the management device 10 of the automobile 1. The master key MASTER_KEY is managed safely.

The initial key writing device 301 is equipped with an ECU-connecting interface for exchanging data with the ECUs 50. The initial key writing device 301 exchanges data with the ECUs 50 connected to the ECU-connecting interface. In this connection, the initial key writing device 301 is equipped with three ECU-connecting interfaces that allow three ECUs 50 to be connected thereto at the same time.

FIG. 4 shows three ECUs 50 as the ECUs 50 to be installed in the automobile 1. The three ECUs 50 will be referred to as ECU_A_50. ECU_B_50, and ECU_C_50 respectively. The following descriptions are made with respect to ECU_A_50, ECU_B_50, and ECU_C_50.

The initial key writing device 301 can be concurrently connected to ECU_A_50, ECU_B_50, and ECU_C_50 via the ECU-connecting interfaces.

(Step S1)

Each of the ECU_A_50, the ECU_B_50, and the ECU_C_50 may transmit its own ECU-identifier to the initial key writing device 301. Specifically, the ECU_A_50 transmits an ECU-identifier ECU_ID_A to the initial key writing device 301. The ECU_B_50 transmits an ECU-identifier ECU_ID_B to the initial key writing device 301. The ECU_C_50 transmits an ECU-identifier ECU_ID_C to the initial key writing device 301.

As an ECU-identifier, for example, it is possible to use an identifier embedded in semiconductor integrated circuitry such as LSI, i.e. the hardware configuring the ECU 50, in manufacture. For example, it is possible to use an identifier embedded in microcomputer LSI of the ECU 50 as an ECU-identifier.

(Step S2)

The initial key writing device 301 generates an ECU-initial key using the master key MASTER_KEY and an ECU-identifier. Specifically, the initial key writing device 301 generates an ECU-initial key Key_A using the master key MASTER_KEY and the ECU-identifier ECU_ID_A for the ECU_A_50. In addition, the initial key writing device 301 generates an ECU-initial key Key_B using the master key MASTER_KEY and the ECU-identifier ECU_ID_B for the ECU_B_50. The initial key writing device 301 generates an ECU-initial key Key_C using the master key MASTER_KEY and the ECU-identifier ECU_ID_C for the ECU_C_50.

Now, the method of generating an ECU-initial key with be described according to Example 1 and Example 2.

(Method of Generating an ECU-Initial Key According to Example 1)

According to Example 1, the method of generating an ECU-initial key uses a hash function. For example, it is possible to calculate a hash value using an input value representing the concatenated data of the master key MAS- TER_KEY and an ECU-identifier, thus using the calculated hash value as an ECU-initial key.

(Method of Generating an ECU-Initial Key According to Example 2)

According to Example 2, the method of generating an ECU-initial key uses an exclusive-OR operation. For example, it is possible to carry out an exclusive-OR operation using the master key MASTER_KEY and an ECU-identifier, thus using the operation result of "master key MASTER_KEY xor ECU-identifier" as an ECU-initial key. Herein, the expression "A xor B" represents an exclusive-OR operation using A and B.

(Step S3)

The initial key writing device 301 writes an ECU-initial key, which is generated above, into the corresponding ECU 50. Specifically, the initial key writing device 301 writes the ECU-initial key Key_A into the ECU_A_50. In addition, the initial key writing device 301 writes the ECU-initial key Key_B into the ECU_B_50. The initial key writing device 301 writes the ECU-initial key Key_C into the ECU_C_50.

All the ECU_A_50, the ECU_B_50, and the ECU_C_50 already written their ECU-initial keys thereon are installed in the automobile 1.

(Stage for Sharing ECU-Initial Keys with Management Device)

Figure 5:
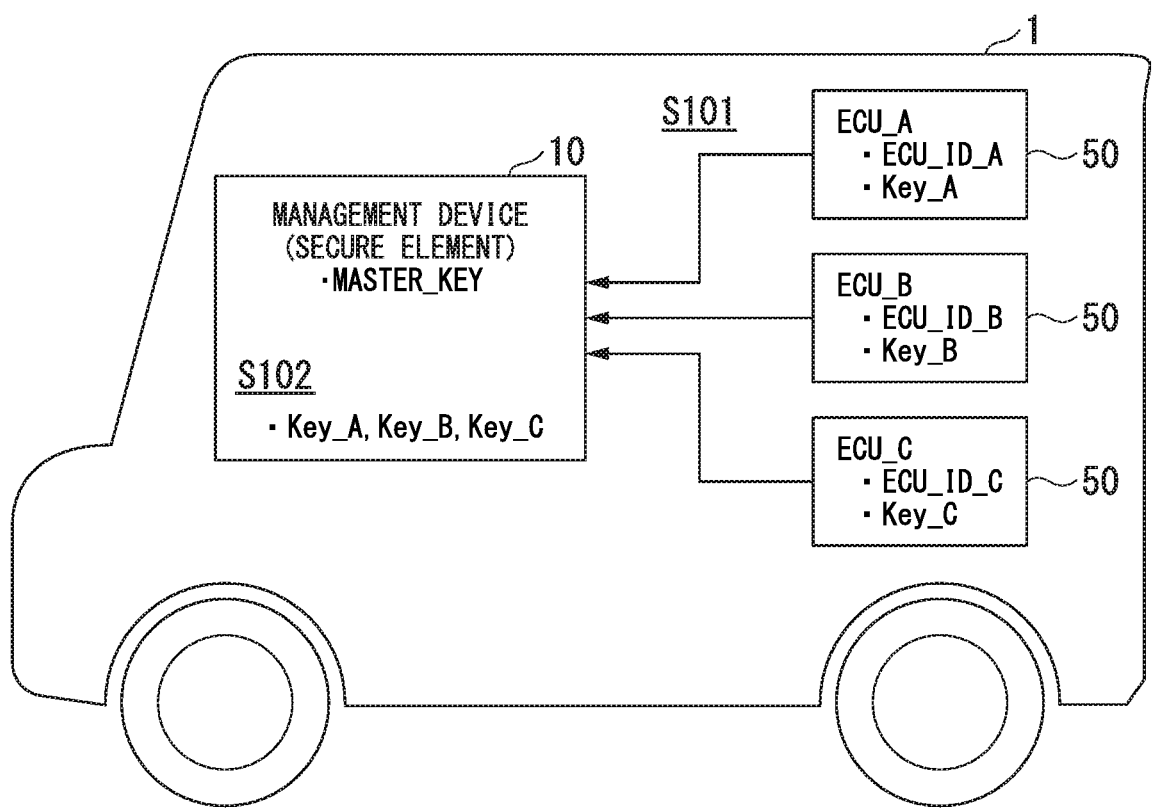
FIG. 5 shows a management method according to the first embodiment.

Next, the stage for sharing ECU-initial keys with the management device 10 will be described with reference to FIG. 5. FIG. 5 is a schematic diagram showing the management method according to the first embodiment. In FIG. 5, the ECU_A_50, the ECU_B_50, and the ECU_C_50 which have been already written their ECU-initial keys thereon by the initial key writing device 301 as shown in FIG. 4 are installed in the automobile 1. The ECU_A_50 possesses the ECU-identifier ECU_ID_A and the ECU-initial key Key_A. The ECU_B_50 possesses the ECU-identifier ECU_ID_B and the ECU-initial key Key_B. The ECU_C_50 possesses the ECU-identifier ECU_ID_C and the ECU-initial key Key_C. The key storage media 22 of the secure element 20 of the management device 10 installed in the automobile 1 stores the master key MASTER_KEY. This master key MASTER_KEY is identical to the master key MASTER_KEY held by the initial key writing device 301.

(Step S101)

Upon being powered at first after installation in the automobile 1, the ECU_A_50, the ECU_B_50, and the ECU_C_50 are activated to transmit their ECU-identifiers to the management device 10 through the on-board control network 40. Specifically, the ECU_A_50 transmits the ECU-identifier ECU_ID_A to the management device 10. The ECU_B_50 transmits the ECU-identifier ECU_ID_B to the management device 10. The ECU_C_50 transmits the ECU-identifier ECU_ID_C to the management device 10.

The management device 10 receives the ECU-identifiers ECU_ID_A, ECU_ID_B, and ECU_ID_C from the ECU_A_50, the ECU_B_50, and the ECU_C_50 through the on-board control network 40. The ECU-identifiers ECU_ID_A, ECU_ID_B, and ECU_ID_C received by the management device 10 are transferred to the secure element 20.

(Step S102)

In the secure element 20 of the management device 10, the key generation part 21 retrieves the master key MASTER_KEY from the key storage media 22 and thereby generate an ECU-initial key using the master key MASTER_KEY and an ECU-identifier. Specifically, the key generation part 21 generates the ECU-initial key Key_A using the master key MASTER_KEY and the ECU-identifier ECU_ID_A of the ECU_A_50. The key generation part 21 generates the ECU-initial key Key_B using the master key MASTER_KEY and the ECU-identifier ECU_ID_B of the ECU_B_50. The key generation part 21 generates the ECU-initial key Key_C using the master key MASTER_KEY and the ECU-identifier ECU_ID_C of the ECU_C_50. The method of generating an ECU-initial key with the key generation part 21 is identical to the method of generating an ECU-initial key with the initial key writing device 301 as shown in FIG. 4.

In the secure element 20 of the management device 10, the key storage media 22 stores ECU-initial keys generated by the key generation part 21 on the ECU initial key storing part 32 in connection with the ECU-identifiers. Specifically, the key storage media 22 stores the ECU-initial key Key_A of the ECU_A_50 on the ECU initial key storing part 32 in connection with the ECU-identifier ECU_ID_A of the ECU_A_50. The key storage media 22 stores the ECU-initial key Key_B of the ECU_B_50 on the ECU initial key storing part 32 in connection with the ECU-identifier ECU_ID_B of the ECU_B_50. The key storage media 22 stores the ECU-initial key Key_C of the ECU_C_50 on the ECU initial key storing part 32 in connection with the ECU-identifier ECU_ID_C of the ECU_C_50. Thus, the secure element 20 of the management device 10 shares the ECU-initial keys Key_A, Key_B, and Key_C with the ECU_A_50, the ECU_B_50, and the ECU_C_50.

As described above, the first embodiment generates an ECU-initial key for each ECU 50 by use of the master key MASTER_KEY and the ECU-identifier for each ECU 50. Thus, it is possible to set different ECU-initial keys with respect to the ECUs 50. For this reason, even when an ECU-initial key for a certain ECU 50 is leaked to the outside, it is possible to prevent a negative impact on the other ECU 50.

IN addition, the ECU 50 installed in the automobile 1 transmits its ECU-identifier to the management device 10 installed in the automobile 1, and then the management device 10 generates an ECU-initial key using the received ECU-identifier and the master key MASTER_KEY.

Thus, it is possible for the management device 10 to share different ECU-initial keys with respect to the ECUs 50. For example, the ECU-initial key shared between the management device 10 and the ECU 50 can be used between the management device 10 and the ECU 50 for the purpose of encryption and decryption in exchanging each type of key, for the purpose of encryption and decryption in exchanging data, and for the purpose of authentication of each communicating partner.

In this connection, it is possible to allow for existence of multiple master keys MASTER_KEY. When multiple manufacturing companies will produce multiple sets of ECUs 50, for example, manufacturing companies may have different master keys MASTER_KEY. The following description refers to this situation. The initial key writing device 301 shown in FIG. 4 has the master key MASTER_KEY for its own manufacturing company. Thus, the ECU-initial key to be written into the ECU 50 by the initial key writing device 301 is generated using the ECU-identifier of the ECU 50 and the master key MASTER_KEY for the manufacturing company of the ECU 50. In addition, the key storage media 22 of the secure element 20 of the management device 10 installed in the automobile 1 stores the master key MASTER_KEY for each manufacturing company. In the secure element 20 of the management device 10, the key generation part 21 retrieves the master key MASTER_KEY regarding the manufacturing company, corresponding to the ECU-identifier received from the ECU 50, from the key storage media 22. Herein, the ECU-identifier of the ECU 50 is configured to identify the manufacturing company of the ECU 50. For example, the ECU-identifier of the ECU 50 includes an identification of the manufacturing company of the ECU 50. The key generation part 21 generates the ECU-initial key by use of the ECU-identifier and the master key MASTER_KEY of the manufacturing company corresponding to the ECU-identifier received from the ECU 50. The ECU-initial key generated by the key generation part 21 is stored on the ECU initial key storing part 32 in connection with the ECU-identifier.

It is possible to achieve the function of the management device 10 by use of the ECU 50 installed in the automobile 1. Herein, the ECU 50 having the function of the management device 10 should include the secure element 20.

Second Embodiment

Figure 6:
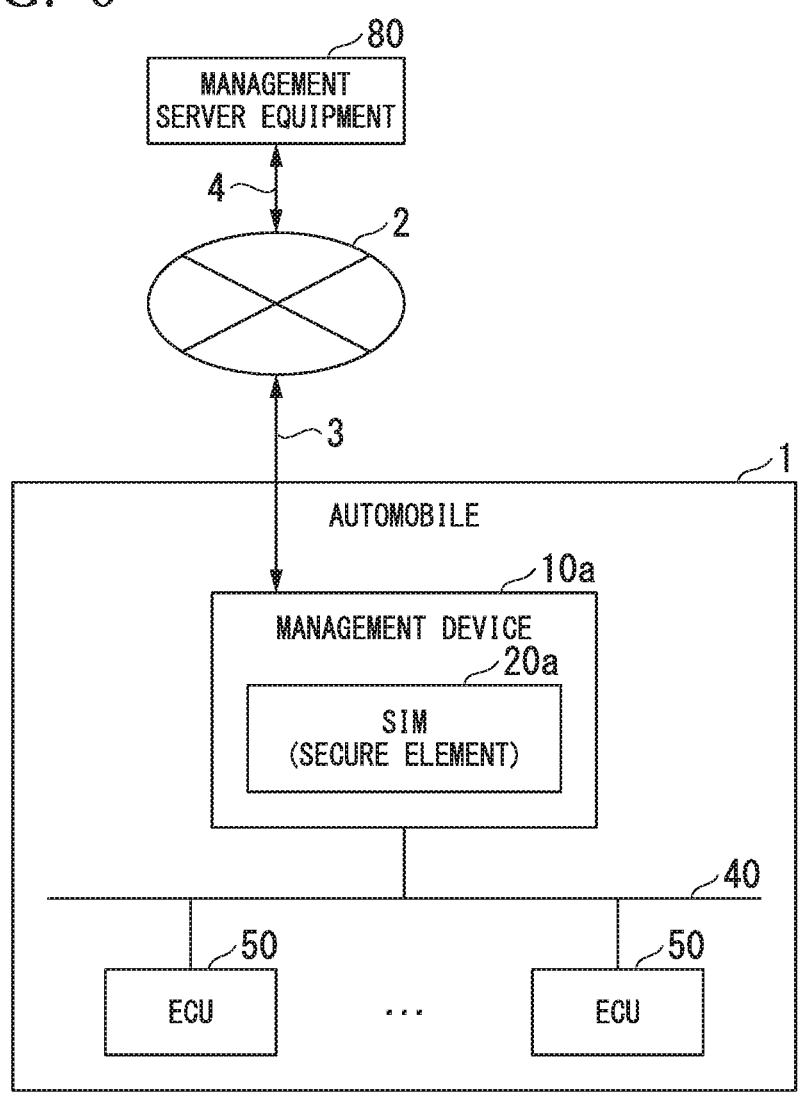
FIG. 6 is a block diagram of a management system according to the second embodiment.

FIG. 6 is a block diagram showing the management system of the second embodiment. In FIG. 6, the parts equivalent to the foregoing parts shown in FIG. 1 will be denoted using the same reference signs; hence, their descriptions will be omitted here. In FIG. 6, the management system includes a management device 10a and management server equipment 80. The management device 10a is installed in the automobile 1. The management device 10a is connected to a wireless communication network 2 through a wireless communication 3. The management server equipment 80 is connected to the wireless communication network 2 through a communication line 4 of a common carrier who handles the wireless communication network 2. For example, the management server equipment 80 is provided by the common carrier of the wireless communication network 2. The management device 10a communicates with the management server equipment 80 through the wireless communication network 2.

To utilize the wireless communication network 2, it is necessary to provide a SIM (Subscriber Identity Module) or an eSIM (Embedded Subscriber Identity Module), which contains subscriber information for the wireless communication network 2. The management device 10a includes a SIM_20a. The SIM_20a represents a SIM that contains subscriber information for the wireless communication network 2. By using the SIM_20a, the management device 10a may access the wireless communication network 2. The management device 10a is connected to the wireless communication network 2 through the wireless communication 3 which is established using the SIM_20a. Herein, the SIM_20a represents a secure element.

In this connection, it is possible to establish a dedicated line passing through the wireless communication network 2 between the management device 10a and the management server equipment 80, and therefore it is possible to send or receive data by the management device 10a and the management server equipment 80 through the dedicated line.

In the automobile 1, the management device 10a is connected to the on-board control network 40. The present embodiment uses a CAN for the on-board control network 40. Various types of ECUs 50 are connected to the on-board control network 40. The management device 10a may exchange data with the ECUs 50 through the on-board control network 40.

Figure 7:
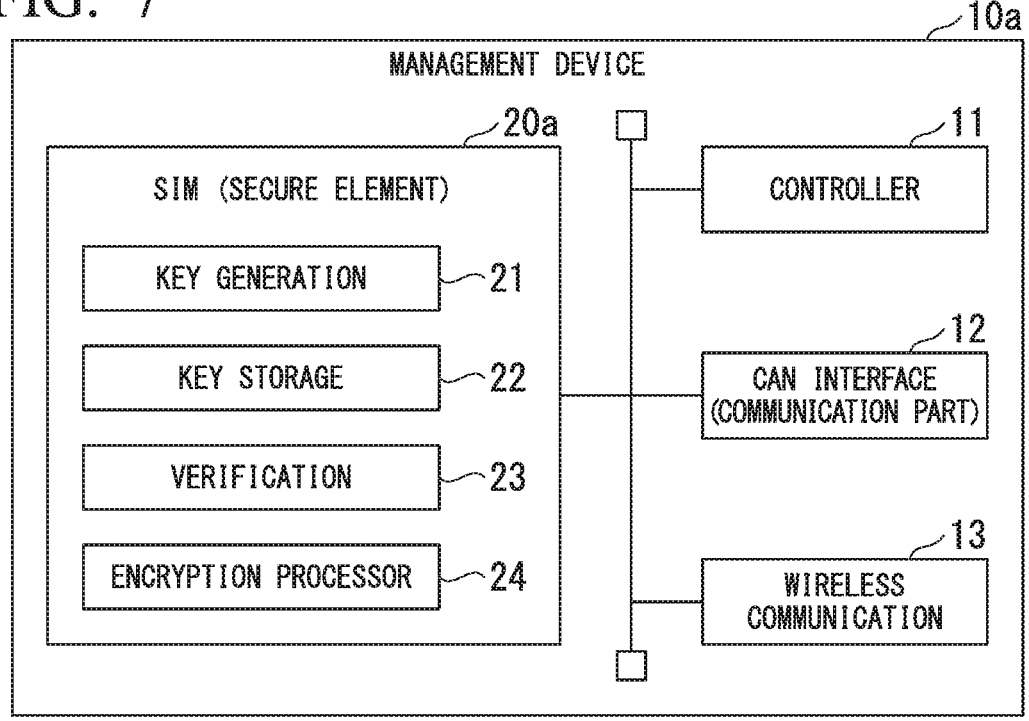
FIG. 7 is a block diagram of a management device according to the second embodiment.

FIG. 7 is a block diagram of the management device 10a according to the second embodiment. In FIG. 7, the parts equivalent to the foregoing parts shown in FIG. 2 will be denoted using the same reference signs; hence, their descriptions will be omitted here. In FIG. 7, the management device 10a includes the controller 11, the CAN interface 12, a wireless communication part 13, and the SIM_20a. Those parts are configured to exchange data therebetween. The SIM_20a includes the key generation part 21, the key storage media 22, the verification part 23, and the encryption processor 24.

The SIM_20a is a secure element having tamper resistance. As the secure element, it is possible to substitute an eSIM for the SIM_20a. Each of the SIM and the eSIM is a type of computer, which achieves desired functions according to computer programs.

The wireless communication part 13 are configured to receive or send data by wireless communication. The SIM_20a is a SIM having written subscriber information for the wireless communication network 2. Therefore, the wireless communication part 13 using the SIM_20a is connected to the wireless communication network 2 through the wireless communication 3.

In the second embodiment, the management device 10a does not have the master key MASTER_KEY. In the management device 10a shown in FIG. 7, the key storage media 22 of the SIM_20a includes only the ECU initial key storing part 32 within the constituent parts of the key storage media 22 shown in FIG. 3. Therefore, in the management device 10a shown in FIG. 7, the key storage media 22 of the SIM_20a does not include the master key storing part 31. The ECU initial key storing part 32 stores ECU-initial keys in connection with ECU-identifiers.

Figure 8:
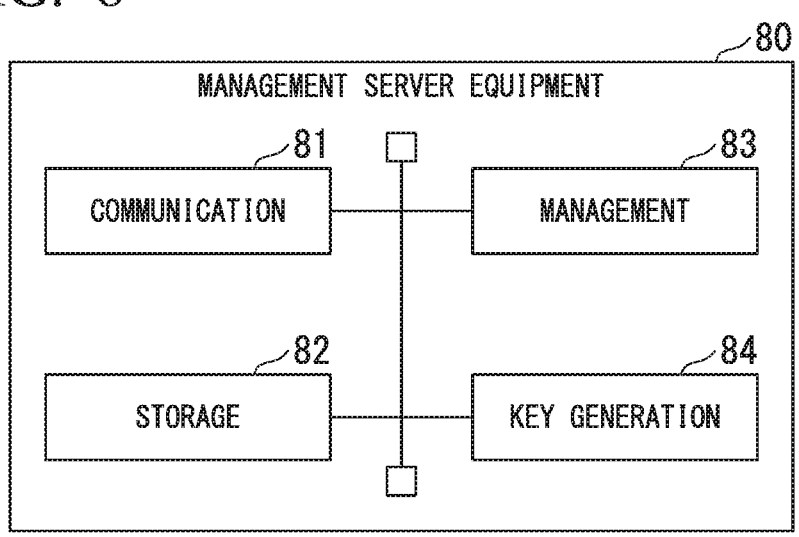
FIG. 8 is a block diagram of management server equipment according to the second embodiment.

FIG. 8 is a block diagram of the management server equipment 80 according to the second embodiment. In FIG. 8, the management server equipment 80 includes a communication part 81, a storage media 82, a management part 83, and a key generation part 84.

Those parts are configured to exchange data therebetween. The communication part 81 send or receives data through the communication line 4. The communication part 81 is connected to the wireless communication network 2 through the communication line 4. The communication part 81 communicates with the management device 10a through the wireless communication network 2. The storage media 82 stores data such as the master key MASTER_KEY. The management part 83 manages the operation of the automobile 1. The key generation part 84 generates keys.

Hereinafter, the method of managing an ECU-initial key will be described according to the second embodiment.

[Stage for Writing ECU-Initial Keys into ECUs]

The stage for writing ECU-initial keys into the ECUs 50 is identical to the foregoing stage according to the first embodiment described with reference to FIG. 4. In the second embodiment, however, the storage media 82 of the management server equipment 80 stores the same master key MASTER_KEY as the foregoing master key held by the initial key writing device 301. In this connection, the management device 10a installed in the automobile 1 does not have the master key MASTER_KEY.

[Stage for Sharing ECU-Initial Keys with Management Device]

Figure 9:
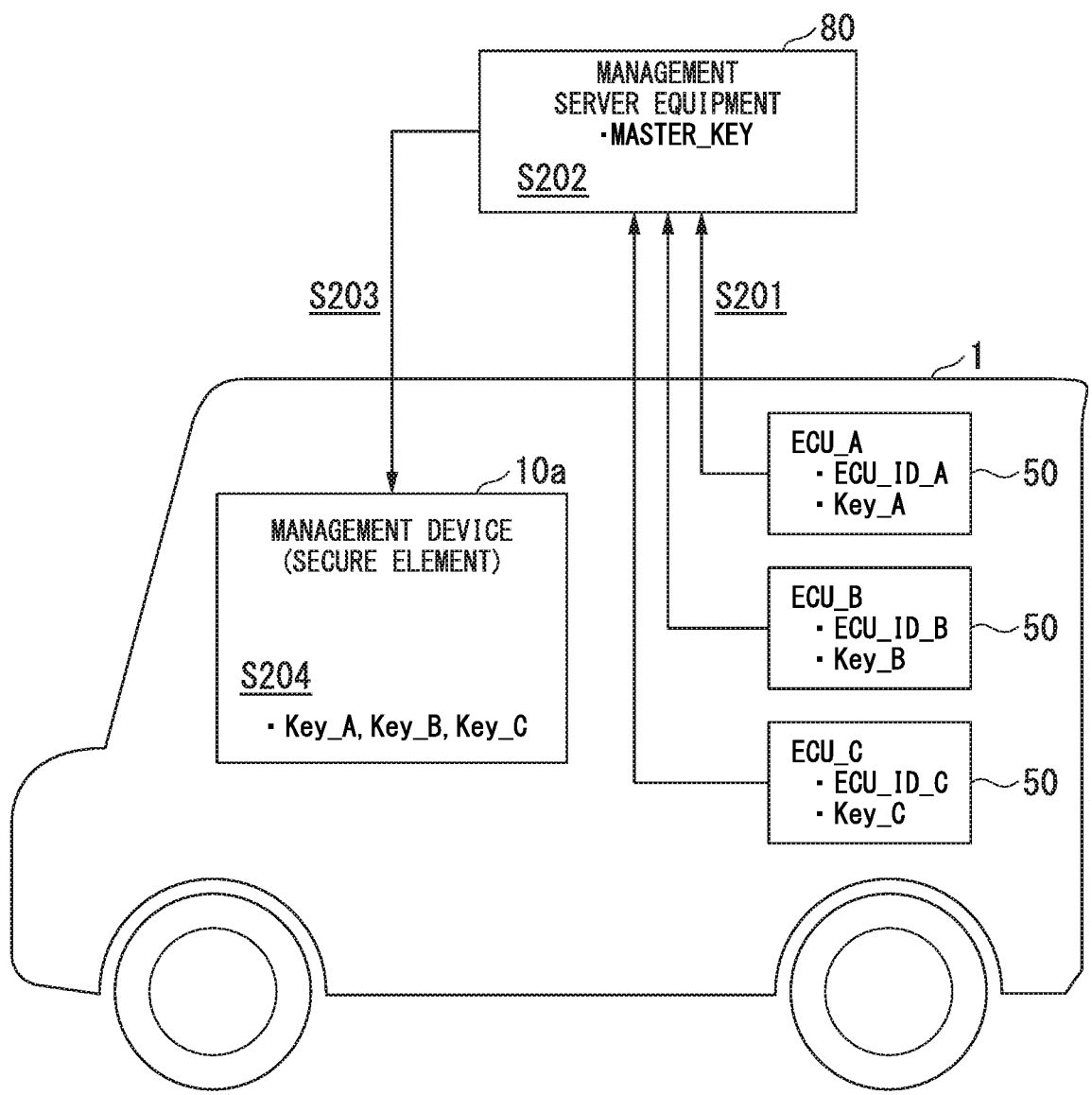
FIG. 9 shows a management method according to the second embodiment.

The stage for sharing ECU-initial keys with the management device 10a will be described with reference to FIG. 9. FIG. 9 shows the management method according to the second embodiment. In FIG. 9, the ECU_A_50, the ECU_B_50, and the ECU_C_50, which have written the ECU-initial keys by the initial key writing device 301 as shown in FIG. 4, are installed in the automobile 1.

The ECU_A_50 has the ECU-identifier ECU_ID_A and the ECU-initial key Key_A. The ECU_B_50 has the ECU-identifier ECU_ID_B and the ECU-initial key Key_B. The ECU_C_50 has the ECU-identifier ECU_ID_C and the ECU-initial key Key_C. The management device 10a is installed in the automobile 1. The management server equipment 80 stores the master key MASTER_KEY. This master key MASTER_KEY is identical to the master key MASTER_KEY owned by the initial key writing device 301.

(Step S201)

Upon being powered at first after installation of the automobile 1, the ECU_A_50, the ECU_B_50, and the ECU_C_50 transmit their ECU-identifiers to the management server equipment 80 via the management device 10a. Specifically, the ECU_A_50 transmits the ECU-identifier ECU_ID_A to the management device 10a through the on-board control network 40. The management device 10a transmits the ECU-identifier ECU_ID_A, which is received from the ECU_A_50 through the on-board control network 40, to the management server equipment 80 through the wireless communication network 2. Similarly, the ECU_B_50 transmits the ECU-identifier ECU_ID_B to the management server equipment 80 via the management device 10a. Similarly, the ECU_C_50 transmits the ECU-identifier ECU_ID_C to the management server equipment 80 via the management device 10a.

The management server equipment 80 receives the ECU-identifiers, i.e. ECU_ID_A, ECU_ID_B, and ECU_ID_C, from the ECU_A_50, the ECU_B_50, and the ECU_C_50 through the wireless communication network 2.

(Step S202)

The key generation part 84 of the management server equipment 80 generates ECU-initial keys using ECU-identifiers received from the management device 10a of the automobile 1 and the master key MASTER_KEY stored on the storage media 82. Specifically, the key generation part 84 generates the ECU-initial key Key_A for the ECU_A_50 by use of the master key MASTER_KEY and the ECU-identifier ECU_ID_A of the ECU_A_50. The key generation part 84 generates the ECU-initial key Key_B for the ECU_B_50 by use of the master key MASTER_KEY and the ECU-identifier ECU_ID_B of the ECU_B_50. The key generation part 84 generates the ECU-initial key Key_C for the ECU_C_50 by use of the master key MASTER_KEY and the ECU-identifier ECU_ID_C of the ECU_C_50. The method of generating an ECU-initial key with the key generation part 84 is identical to the foregoing method of generating an ECU-initial key with the initial key writing device 301 as shown in FIG. 4.

(Step S203)

The management server equipment 80 transmits the ECU-identifier and the ECU-initial key, which is generated using the master key MASTER_KEY and the ECU-identifier, to the management device 10a of the automobile 1 through the wireless communication network 2. Specifically, the management server equipment 80 transmits a pair of the ECU-identifier ECU_ID_A and the ECU-initial key Key_A to the management device 10a of the automobile 1 through the wireless communication network 2. The management server equipment 80 transmits a pair of the ECU-identifier ECU_ID_B and the ECU-initial key Key_B to the management device 10a of the automobile 1 through the wireless communication network 2. The management server equipment 80 transmits a pair of the ECU-identifier ECU_ID_C and the ECU-initial key Key_C to the management device 10a of the automobile 1 through the wireless communication network 2.

The management device 10a of the automobile 1 receives from the management server equipment 80 through the wireless communication network 2 a pair of the ECU-identifier ECU_ID_A and the ECU-initial key Key_A, a pair of the ECU-identifier ECU_ID_B and the ECU-initial key Key_B, a pair of the ECU-identifier ECU_ID_C and the ECU-initial key Key_C.

(Step S204)

In the SIM_20a of the management device 10a, the key storage media 22 stores pairs of ECU-identifiers and ECU-initial keys received from the management server equipment 80 on the ECU initial key storing part 32. Specifically, the key storage media 22 stores on the ECU initial key storing part 32 the ECU-initial key Key_A paired with the ECU-identifier ECU_ID_A received from the management server equipment 80 in connection with the ECU-identifier ECU_ID_A of the ECU_A_50 received from the management server equipment 80. It stores on the ECU initial key storing part 32 the ECU-initial key Key_B paired with the ECU-identifier ECU_ID_B received from the management server equipment 80 in connection with the ECU-identifier ECU_ID_B of the ECU_B_50 received from the management server equipment 80. It stores on the ECU initial key storing part 32 the ECU-initial key Key_C paired with the ECU-identifier ECU_ID_C received from the management server equipment 80 in connection with the ECU-identifier ECU_ID_C of the ECU_C_50 received from the management server equipment 80. Thus, the SIM_20a of the management device 10a shares the ECU-initial keys, i.e. Key_A, Key_B, and Key_C, with the ECU_A_50, the ECU_B_50, and the ECU_C_50.

As described above, the second embodiment is designed to generate ECU-initial keys using ECU-identifiers for the ECUs 50 and the master key MASTER_KEY Thus, it is possible to set different ECU-initial keys with respect to the ECUs 50. For this reason, even when an ECU-initial key for a certain ECU 50 is leaked to the outside, it is possible to prevent a negative impact on the other ECU 50.

In addition, the ECU-identifier for the ECU 50 installed in the automobile 1 is transmitted to the management server equipment 80 from the management device 10a installed in the automobile 1, and therefore the management server equipment 80 generates an ECU-initial key using its own master key MASTER_KEY and the ECU-identifier received from the management device 10a, thus transmitting the ECU-initial key to the management device 10a. Thus, the management device 10a and the ECUs 50 can share different ECU-initial keys, which are provided for the ECUs 50. For example, the ECU-initial keys shared between the management device 10a and the ECUs 50 can be used between the management device 10a and the ECUs 50 for the purpose of encryption and decryption in exchanging various types of keys, for the purpose of encryption and decryption in exchanging data, and for the purpose of authentication of each communication partner.

In this connection, it is possible to provide multiple master keys MASTER_KEY. When multiple manufacturing companies produce ECUs 50, for example, those manufacturing companies may have different master keys MASTER_KEY. The following description refers to this situation. The initial key writing device 301 shown in FIG. 4 has the master key MASTER_KEY for its own manufacturing company. That is, the ECU-initial key to be written into the ECU 50 by the initial key writing device 301 is generated using the master key MASTER_KEY for the manufacturing company producing the ECU 50 and the ECU-identifier for the ECU 50. In addition, the management server equipment 80 stores the master key MASTER_KEY for each manufacturing company. The management server equipment 80 generates an ECU-initial key by use of the ECU-identifier and the master key MASTER_KEY owned by the manufacturing company corresponding to the ECU-identifier received from the management device 10a of the automobile 1. The ECU-identifier of the ECU 50 is configured to identify the manufacturing company of the ECU 50. For example, the ECU-identifier of the ECU 50 includes an identification of the manufacturing company producing the ECU 50. The ECU-initial key generated by the management server equipment 80 is transmitted to the management device 10a in connection with the ECU-identifier. In the SIM_20a of the management device 10a, the key storage media 22 stores a pair of the ECU-identifier and the ECU-initial key received from the management server equipment 80 on the ECU initial key storing part 32.

In addition, the ECU 50 installed in the automobile 1 may achieve the function of the management device 10a. The ECU 50 realizing the function of the management device 10a includes the wireless communication part 13 and the SIM_20a.

According to the second embodiment as described above, the automobile 1 wirelessly communicates with the management server equipment 80 in the stage for sharing ECU-initial keys with the management device. In contrast, the first embodiment is designed such that the automobile 1 may inherently implement the stage for sharing ECU-initial keys with the management device. For this reason, the aforementioned first embodiment is applicable to any environments incapacitating wireless communications.

Third Embodiment

Figure 10:
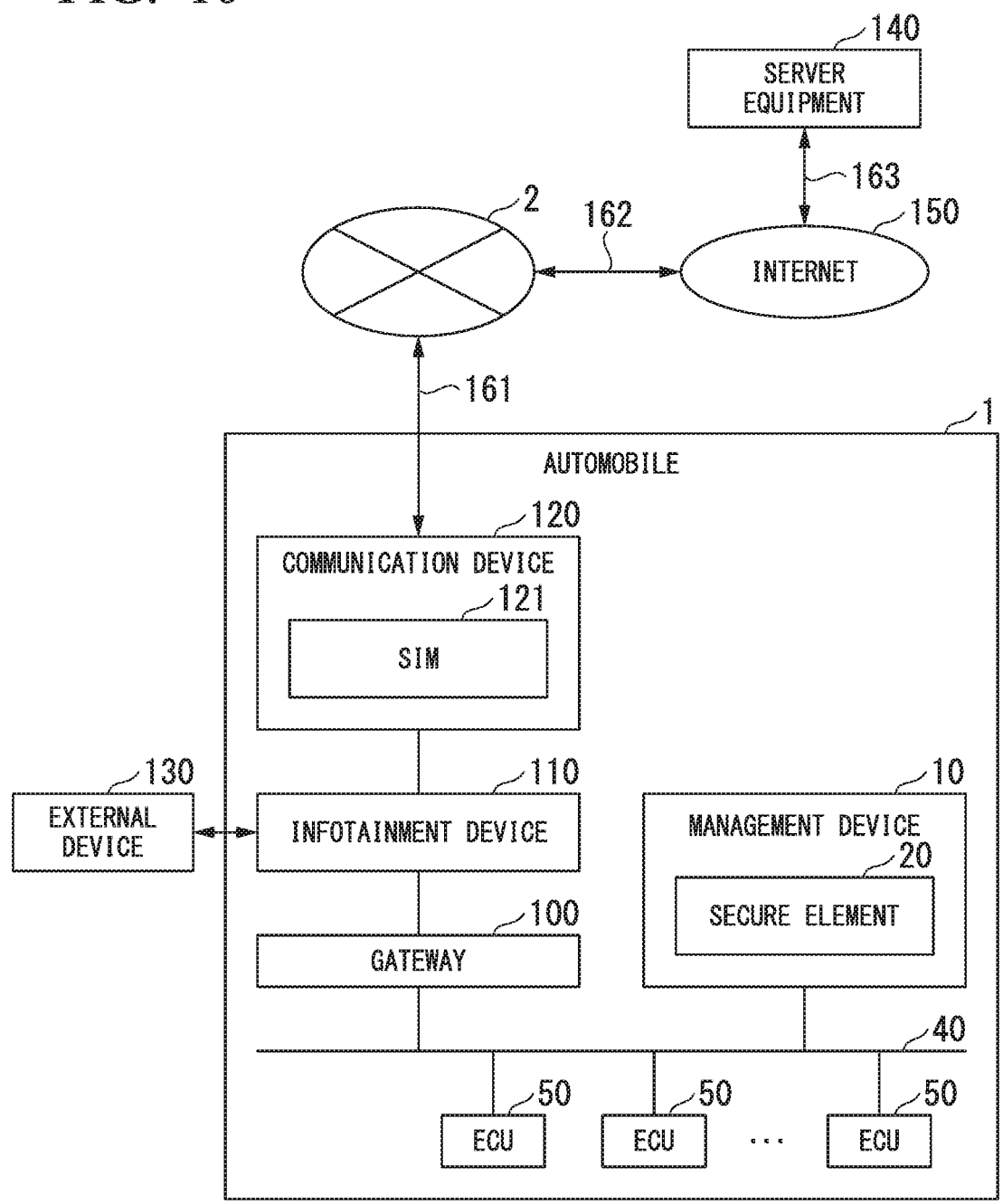
FIG. 10 is a block diagram of an automobile according to the third embodiment.

FIG. 10 is a block diagram of the automobile 1 according to the third embodiment. In FIG. 10, the parts equivalent to the foregoing parts shown in FIG. 1 will be denoted using reference signs; hence, their descriptions will be omitted here. Compared with the automobile 1 shown in FIG. 1, the automobile 1 shown in FIG. 10 further includes a gateway 100, an infotainment device 110, and a communication device 120. The communication device 120 includes an SIM_121. The SIM_121 is an SIM having written subscriber information for the wireless communication network 2. Therefore, the communication device 120 can access the wireless communication network 2 by use of the SIM_121. The communication device 120 is connected to the wireless communication network 2 through a wireless communication 161 which is established using the SIM_121. The wireless communication network 2 is connected to the Internet 150 through a communication line 162. Server equipment 140 is connected to the Internet 150 through a communication line 163. The communication device 120 communicates with the server equipment 140 connected to the Internet 150 through the wireless communication network 2.

The infotainment device 110 of the automobile 1 receives or sends data with the server equipment 140 via the communication device 120. The infotainment device 110 is connected to an external device 130 so as to exchange data with the external device 130. As the external device 130, for example, it is possible to mention mobile communication terminals, audio-visual devices, and the like.

In the automobile 1, the gateway 100 is connected to the on-board control network 40. The infotainment device 110 receives or sends data with the management device 10 and the ECUs 50 connected to the on-board control network 40 via the gateway 100. The gateway 100 monitors reception/transmission of data between the infotainment device 110 and the ECUs 50 as well as reception/transmission of data between the management device 10 and the infotainment device 110.

In this connection, the ECU 50 installed in the automobile 1 may achieve the function of the management device 10. The ECU 50 realizing the function of the management device 10 includes the secure element 20.

Fourth Embodiment

Figure 11:
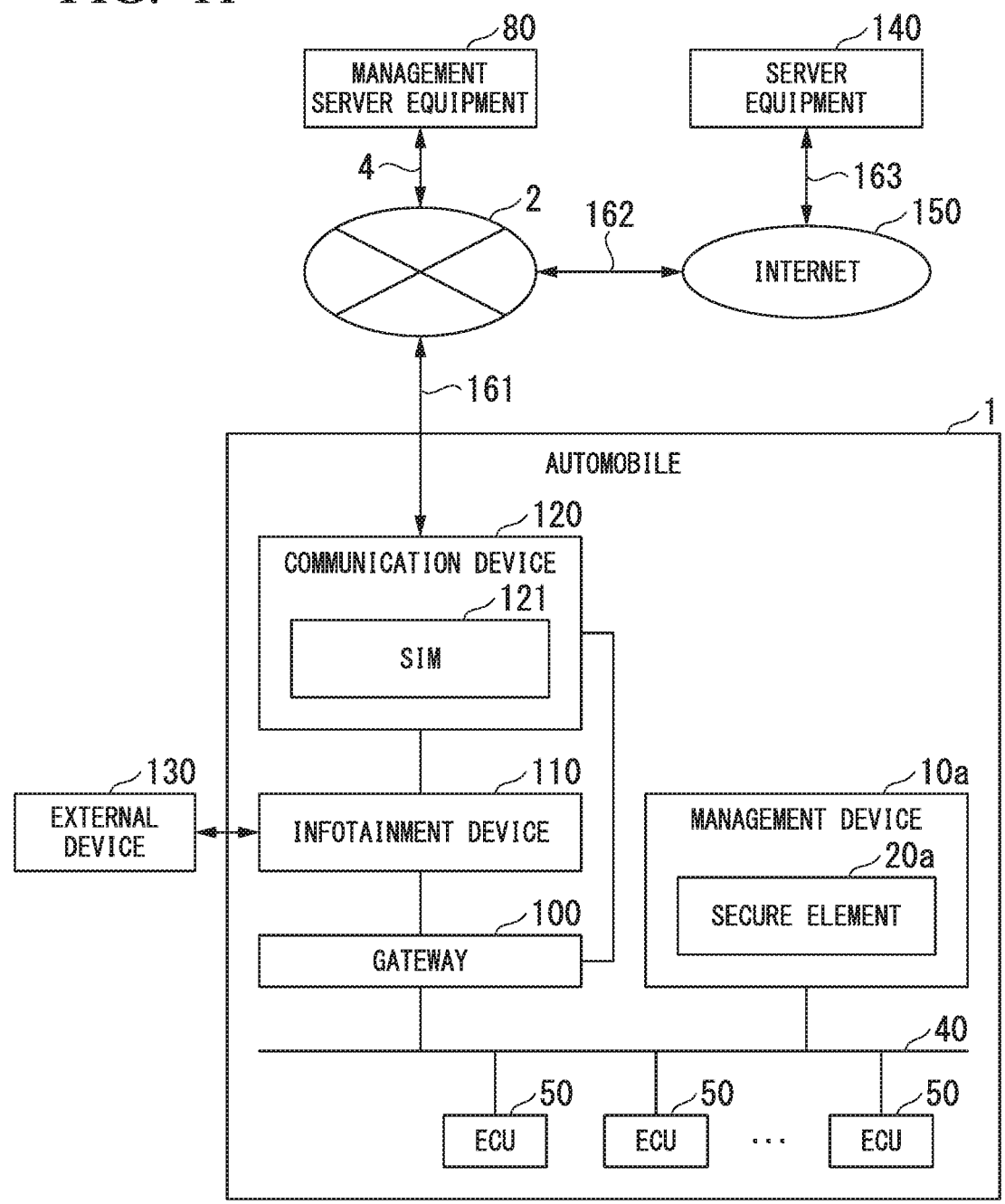
FIG. 11 is a block diagram of a management system according to the fourth embodiment.

The fourth embodiment exemplifies a combination of the second embodiment and the third embodiment. FIG. 11 is a block diagram of a management system according to the fourth embodiment. In FIG. 11, the parts equivalent to the foregoing parts shown in FIGS. 6 and 10 will be denoted using the same reference signs; hence, their descriptions will be omitted here.

In FIG. 11, the communication device 120 is connected to the wireless communication network 2 through a wireless communication 161. The communication device 120 communicates with the management server equipment 80 through the wireless communication network 2. The management device 10a receives or sends data with the communication device 120 through the gateway 100. The management device 10a receives or sends data with the management server equipment 80 via the communication device 120. The gateway 100 monitors reception/transmission of data between the communication device 120 and the management device 10a.

In the fourth embodiment, the management device 10a communicates with the management server equipment 80 via the communication device 120. For this reason, the management device 10a shown in FIG. 11 does not need to install the wireless communication part 13 shown in FIG. 7. When the management device 10a shown in FIG. 11 does not include the wireless communication part 13, it is unnecessary to provide a SIM as the secure element 20a. The secure element 20a shown in FIG. 11 includes the constituent elements 21-24 of the SIM_20a shown in FIG. 7.

In this connection, the ECU 50 installed in the automobile 1 may achieve the function of the management device 10a. The ECU 50 realizing the function of the management device 10a should include the secure element 20a.

According to the fourth embodiment, the automobile 80 wirelessly communicates with the management server equipment 80 in the stage for sharing ECU-initial keys with the management device. In the third embodiment, however, the automobile 1 may inherently implement the stage for sharing ECU-initial keys with the management device. For this reason, the third embodiment may be applicable to any environments incapacitating wireless communications.

Fifth Embodiment

Figure 12:
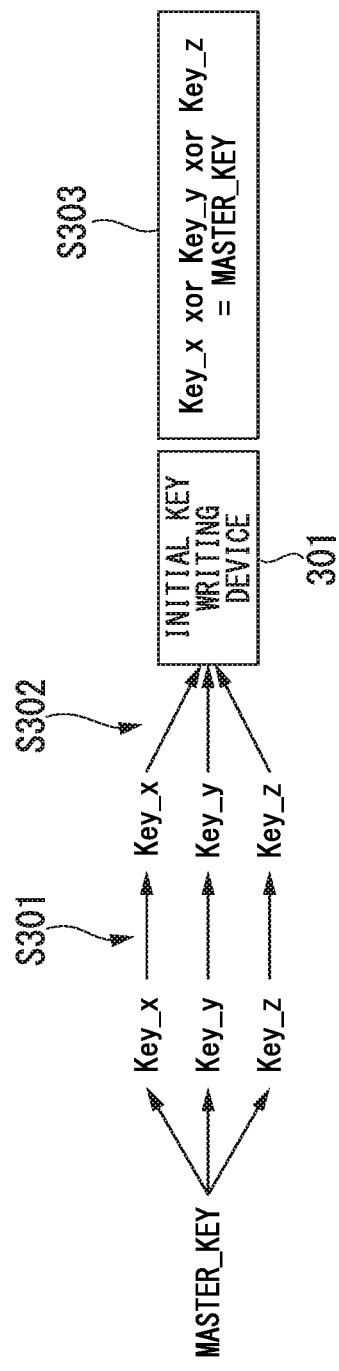
FIG. 12 shows a management method according to the fifth embodiment.

FIG. 12 is a schematic diagram showing the management method according to the fifth embodiment. The master key MASTER_KEY is shared between multiple devices. In the first embodiment, for example, the master key MASTER_KEY is shared between the initial key writing device 301 and the management device 10 of the automobile 1.

In the second embodiment, the master key MASTER_KEY is shared between the initial key writing device 301 and the management server equipment 80. The fifth embodiment aims to safely share the master key MASTER_KEY among multiple devices.

The master key MASTER_KEY includes multiple elements. In an example of FIG. 12, the master key MASTER_KEY is produced by an exclusive-OR operation "Key_x xor Key_xor Key_z" using three elements, i.e. Key_x, Key_y, and Key_z.

FIG. 12 shows the example for writing the master key MASTER_KEY into the initial key writing device 301. Hereinafter, the management method of the fifth embodiment will be described with reference to FIG. 12.

(Step S301)

Three elements of the master key MASTER_KEY. i.e. Key_x, Key_y, and Key_z, are each delivered from their delivery sources to the manager of the initial key writing device 301 corresponding to a delivery destination through different delivery routes. For example, the element Key_x is mailed to the delivery destination; the element Key_y is delivered to the delivery destination by another delivery company different from the mail service; and the element Key_z is brought to the delivery destination by some representative of its delivery source.

(Step S302)

Upon receiving three elements Key_x, Key_y, and Key_z being delivered in different manners, the manager of the initial key writing device 301 separately inputs those elements into the initial key writing device 301.

(Step S303)

The initial key writing device 301 executes an exclusive-OR operation using three elements Key_x, Key_y, and Key_z separately input thereto. The initial key writing device 301 generates the master key MASTER_KEY resulting from an exclusive-OR operation "Key_x xor Key_y xor Key_z".

The master key MASTER_KEY is shared by multiple devices, which are configured to share the master key MASTER_KEY, according to the procedure of FIG. 12. Thus, it is possible to safely share the master key MASTER_KEY among multiple devices.

When the master key MASTER_KEY is leaked to the outside, it is possible to assure safety by rewriting the master key MASTER_KEY held by multiple devices. In the first embodiment, for example, it is possible to rewrite the master key MASTER_KEY held by the secure element 20 of the management device 10 installed in the automobile 1 shown in FIG. 1 by exchanging the management device 10 with a new management device. In the third embodiment, for example, it is possible to rewrite the master key MASTER_KEY held by the secure element 20 of the management device 10 installed in the automobile 1 shown in FIG. 10 via the communication device 120 through the wireless communication network 2. In the second and fourth embodiments, it is possible to rewrite the master key MASTER_KEY held by the management server equipment 80 shown in FIGS. 6 and 11 according to the procedure shown in FIG. 12.

When the master key MASTER_KEY is leaked to the outside, it is preferable to update ECU-initial keys in addition to rewriting the master key MASTER_KEY held by multiple devices. The method of updating ECU-initial keys will be described below.

In the first and third embodiments, the key generation part 21 of the secure element 20 of the management device 10 installed in the automobile 1 shown in FIGS. 1 and 10 generates new ECU-initial keys for the ECUs 50 by use of the new master key MASTER_KEY and ECU-identifiers of the ECUs 50. Herein, new ECU-initial keys are each encrypted using exchange keys and then safely transferred to the ECUs 50 from the management device 10. The management device 10 transfers exchange keys to the ECUs 50 that have been already authenticated. The ECUs 50 decrypt the new ECU-initial keys, which are encrypted and received from the management device 10, by use of the exchange keys, and therefore the ECUs 50 update their original ECU-initial keys with new ECU-initial keys resulting from decryption.

In this connection, the unauthenticated ECU 50 should be recollected and then updated its ECU-initial key by the initial key writing device 301. As the unauthenticated ECU 50, for example, it is possible to mention another ECU 50 that has not been installed in the automobile 1 yet. The initial key writing device 301 generates a new ECU-initial key for the recollected ECU 50 by use of the new master key MASTER_KEY and the ECU-identifier for the recollected ECU 50. The initial key writing device 301 generates and writes the new ECU-initial key into the recollected ECU 50 so as to update its ECU-initial key with the new ECU-initial key.

In the second and fourth embodiments, the management server equipment 80 shown in FIGS. 6 and 11 generates new ECU-initial keys for the ECUs 50 by use of the new master key MASTER_KEY and the ECU-identifiers for the ECUs 50. The new ECU-initial keys for the ECUs 50, together with the ECU-identifiers for the ECUs 50, are transmitted from the management server equipment 80 to the management device 10a through the wireless communication network 2. The management device 10a holds pairs of the new ECU-initial keys and the ECU-identifiers received from the management server equipment 80. In addition, the management device 10a encrypts the new ECU-initial keys, which are received from the management server equipment 80 together with the ECU-identifiers, by use of exchange keys so as to transmit the encrypted new ECU-initial keys to the ECUs 50 identified by the ECU-identifiers received from the management server equipment 80. Herein, the management device 10a transfers the exchange keys to the already-authenticated ECUs 50 for the purpose of exchanging keys. The ECUs 50 decrypt the encrypted new ECU-initial keys received from the management device 10a by use of the exchange keys so as to update their original ECU-initial keys held by themselves with the new ECU-initial keys resulting from decryption. As described above, the unauthenticated ECU 50 should be recollected and then updated in terms of its ECU-initial key by the initial key writing device 301.

Heretofore, the present invention has been described in detail by way of the foregoing embodiments with reference to the drawings; however, the concrete configurations should not be limited to the foregoing embodiments; hence, the present invention may embrace any changes in design without departing from the essence of the invention.

For example, the foregoing embodiments refer to a SIM or an eSIM as an example of the secure element; but this is not a restriction. As the secure element, for example, it is possible to use encryption processing chips having tamper resistance. As encryption processing chips having tamper resistance, for example, it is possible to mention well-known chips called HSM (Hardware Security Module), TPM (Trusted Platform Module), SHE (Secure Hardware Extension), and the like. For example, Non-Patent Literature 3 refers to TPM. For example, it is possible to use HSM, TPM, or SHE for the secure element 20 of the management device 10. Alternatively, it is possible to use a SIM or an eSIM for the secure element 20 of the management device 10. In addition, it is possible to use HSM, TPM, or SHE for the secure element 20*a* of the management device 10*a* according to the fourth embodiment shown in FIG. 11.

Another embodiment of the present invention will be described below.

Sixth Embodiment

Figure 13:
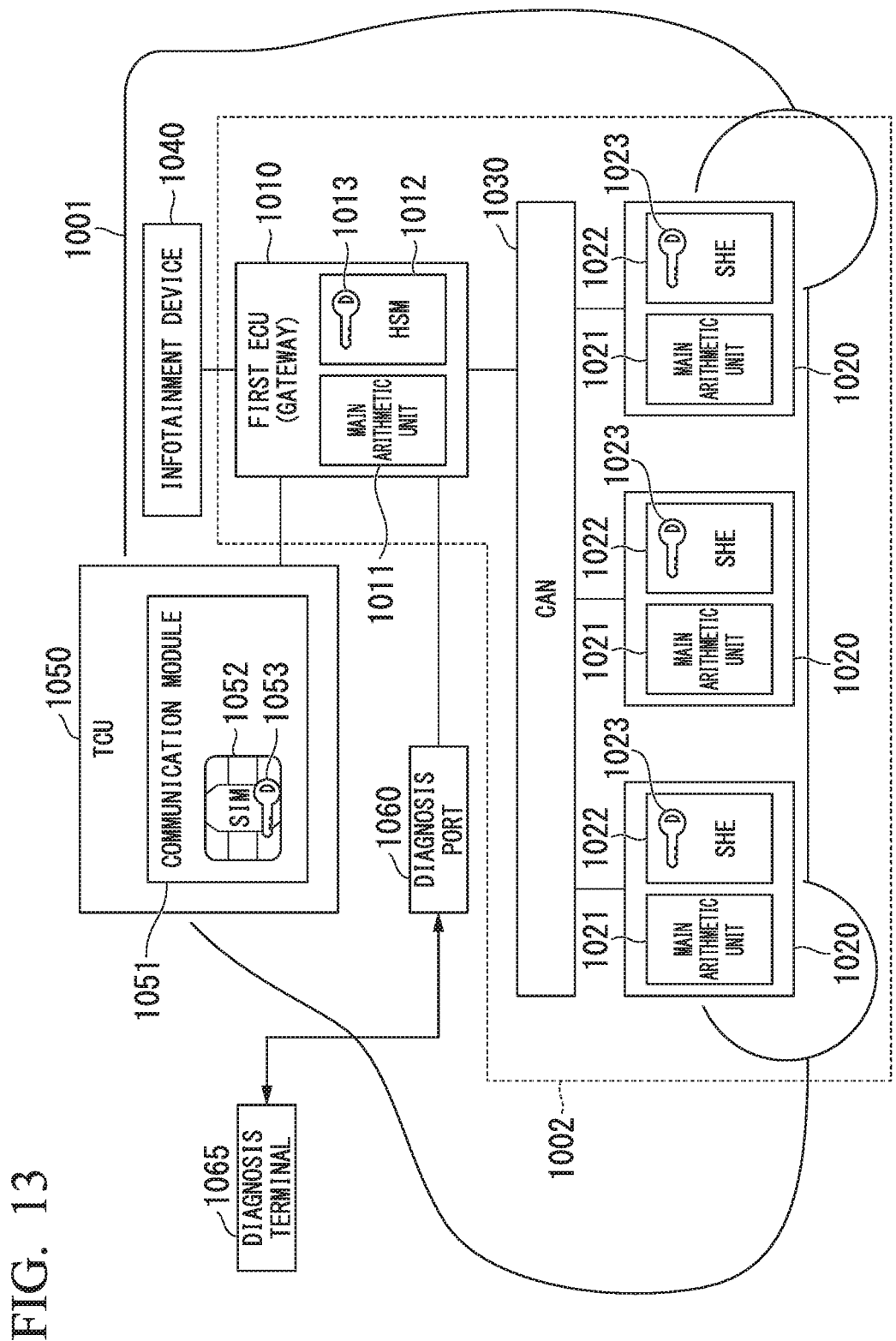
FIG. 13 is a block diagram of an automobile according to the sixth embodiment.

FIG. 13 is a block diagram of an automobile 1001 according to the sixth embodiment. In FIG. 13, the automobile 1001 includes a first ECU 1010 and a plurality of second ECUs 1020. The first ECU 1010 and the second ECUs 1020 are on-board computers installed in the automobile 1001. Among the ECUs installed in the automobile 1001, the first ECU 1010 has the function of a gateway. Among the ECUs installed in the automobile 1001, the second ECUs 1020 have the function for controlling an engine or the like. As the second ECU 1020, for example, it is possible to mention an ECU having the function for controlling an engine, an ECU having the function for controlling a handle, and an ECU having the function for controlling a brake.

The first ECU 1010 and the second ECUs 1020 are connected to a CAN (Controller Area Network) 1030 installed in the automobile 1001. The CAN is a communication network. The CAN is known as one type of communication networks installed in a vehicle.

The first ECU 1010 exchanges data with the second ECUs 1020 through the CAN 1030. Each of the second ECUs 1020 exchanges data with the other second ECU 1020.

As the communication network installed in a vehicle, it is possible to use another type of communication network other than the CAN to be installed in the automobile 1001; hence, it is possible to exchange data between the first ECU 1010 and the second ECU 1020 and to exchange data between the second ECUs 1020 through another type of communication network other than the CAN. For example, it is possible to install a LIN (Local Interconnect Network) in the automobile 1001. In addition, it is possible to install both the CAN and the LIN in the automobile 1001. Moreover, it is possible to provide a second ECU 1020 connectible to the LIN in the automobile 1001.

The first ECU 1010 may be connected to both the CAN and the LIN. In addition, the first ECU 1010 may exchange data with the second ECU 1020 connected to the CAN through the CAN while the first ECU 1010 may exchange data with the second ECU 1020 connected to the LIN through the LIN. Alternatively, it is possible for the second ECUs 1020 to exchange data through the LIN.

The automobile 1001 is equipped with a diagnosis port 1060. As the diagnosis port 1060, for example, it is possible to use an OBD port. Herein, a diagnosis terminal 1065 is connectible to the diagnosis port 1060. The diagnosis port 1060 is connected to the first ECU 1010. The first ECU 1010 exchanges data with the diagnosis terminal 1065 connected to the diagnosis port 1060 through the diagnosis port 1060.

The automobile 1001 is equipped with an infotainment device 1040. As the infotainment device 1040, for example, it possible to mention various types of devices having a navigation function, a position information service function, a multimedia playback function for music and moving pictures, an audio communication function, a data communication function, an Internet connecting function, and the like. The infotainment device 1040 is connected to the first ECU 1010. The first ECU 1010 transmits the information input from the infotainment device 1040 to the second ECUs 1020.

The automobile 1001 is equipped with a TCU (Tele-Communication Unit) 1050. The TCU 1050 is a communication device. The TCU 1050 is equipped with a communication module 1051. The communication module 1051 carries out wireless communication using a wireless communication network. The communication module 1051 is equipped with a SIM (Subscriber Identity Module) 1052. The SIM 1052 is a SIM having written the information for accessing a wireless communication network. The communication module 1051 uses the SIM 1052 to access the wireless communication network, thus implementing wireless communication.

The SIM 1052 is equipped with a key storage media 1053 for storing keys. As the SIM 1052, it is possible to use an eSIM (Embedded Subscriber Identity Module). Herein, both the SIM and the eSIM have tamper resistance. The SIM and the eSIM are examples of secure elements. The secure element has tamper resistance. Each of the SIM and the eSIM is one type of computer that achieves desired functions according to computer programs.

The TCU 1050 is connected to the first ECU 1010. The first ECU 1010 exchanges data with the communication module 1051 of the TCU 1050.

In the configuration of FIG. 13, the first ECU 1010 is directly connected to the TCU 1050 so that the first ECU 1010 can exchange data with the communication module 1051; but this is not a restriction. For example, it is possible to connect the TCU 1050 to the infotainment device 1040 so that the first ECU 1010 can exchange data with the communication module 1051 of the TCU 1050 via the infotainment device 1040. Alternatively, it is possible to connect the TCU 1050, instead of the diagnosis terminal 1065, to the diagnosis port 1060 so that the first ECU 1010 can exchange data with the communication module 1051 of the TCU 1050 connected to the diagnosis port 1060 through the diagnosis port 1060. In addition, the first ECU 1010 may be equipped with the communication module 1051 including the SIM 1052. The automobile 1001 does not need to include the TCU 1050 when the first ECU 1010 is equipped with the communication module 1051 including the SIM 1052.

The first ECU 1010 includes a main arithmetic unit 1011 and an HSM (Hardware Security Module) 1012. The main arithmetic unit 1011 executes computer programs to achieve the function of the first ECU 1010. The HSM 1012 has an encryption processing function. The HSM 1012 has tamper resistance. The HSM 1012 includes a key storage media 1013 for storing keys. The main arithmetic unit 1011 uses the HSM 1012.

The second ECU 1020 includes a main arithmetic unit 1021 and an SHE (Secure Hardware Extension) 1022. The main arithmetic unit 1021 executes computer programs to achieve the function of the second ECU 1020. The SHE 1022 has an encryption processing function. The SHE 1022 has tamper resistance. The SHE 1022 includes a key storage media 1023 for storing keys. The main arithmetic unit 1021 uses the SHE 1022.

An on-board computer system 1002 installed in the automobile 1001 is configured such that the first ECU 1010 and a plurality of second ECUs 1020 are connected together through the CAN 1030. The first ECU 1010 has a gateway function to monitor communication between the inside and the outside of the on-board computer system 1002. In this connection, the on-board computer system 1002 may further include the SIM 1052 of the communication module 1051.

Next, the management method of the present embodiment will be described below.

[Stage for Writing ECU-Initial Keys into ECUs]

Figure 14:
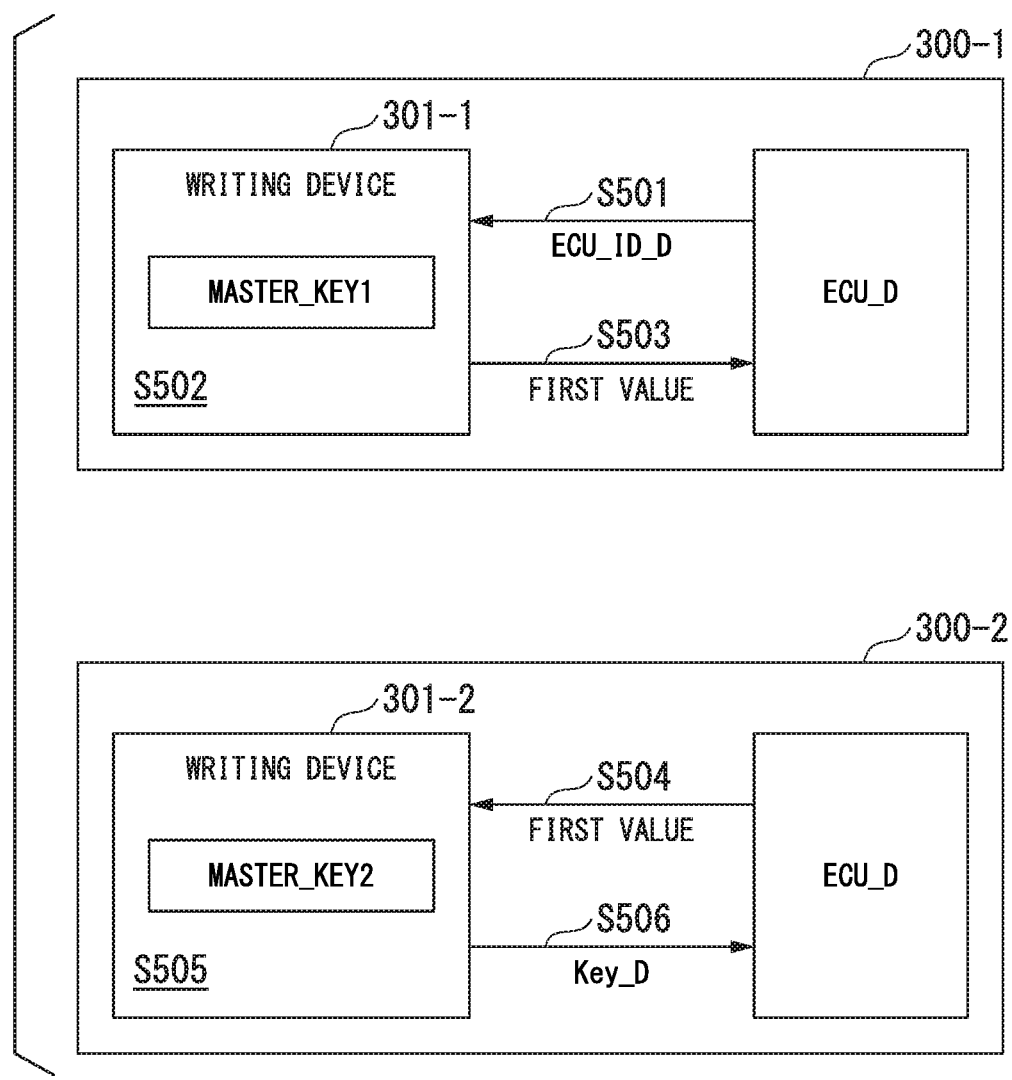
FIG. 14 shows a management method according to the sixth embodiment.

The stage for writing ECU-initial keys into ECUs will be described according to the present embodiment with reference to FIG. 14. FIG. 14 is a schematic diagram showing the management method according to the sixth embodiment. The sixth embodiment uses a plurality of master keys for generating ECU-initial keys.

In FIG. 14, a writing device 301-1 is set up in a room 300-1 of a first manufacturing factory. A writing device 301-2 is set up in a room 300-2 of a second manufacturing factory. Information security is provided for both the rooms 300-1 and 300-2. For example, the first manufacturing factory serves as an ECU manufacturer for producing ECUs. For example, the second manufacturing factory serves as a manufacturer of OEM (Original Equipment Manufacturing) supply destination, which may attach ECUs supplied by an ECU manufacturer to automobiles as its own ECUs having company's brands.

The writing device 301-1 has a first master key MASTER_KEY1. The first master key MASTER_KEY1 is set to the writing device 301-1 in advance. It is possible to safely set the first master key MASTER_KEY1 to the writing device 301-1. The writing device 301-2 has a second master key MASTER_KEY2. The second master key MASTER_KEY2 is set to the writing device 301-2 in advance. It is possible to safely set the second master key MASTER_KEY2 to the writing device 301-2.

Both the writing devices 301-1 and 301-2 have an ECU-connecting interface to exchange data with ECUs. That is, the writing devices 301-1 and 301-2 exchange data with ECUs each connected to the ECU-connecting interface.

FIG. 14 shows a single ECU as the ECU mounted on the automobile 1001. This single ECU will be referred to as ECU_D. The ECU_D may stand for the first ECU 1010 or the second ECU 1020.

(Step S501)

The ECU_D is connected to the writing device 301-1 in the room 300-1 of the first manufacturing factory. The ECU_D transmits its own ECU-identifier. i.e. ECU_ID_D, to the writing device 301-1.

As the ECU-identifier, for example, it is possible to use an identifier embedded in semiconductor integrated circuitry such as LSI, serving as hardware configuring each ECU, in manufacturing. For example, it is possible to use an ECU-identifier as an identifier embedded in LSI of a microcomputer of ECU.

(Step S502)

The writing device 301-1 generates a first value using the ECU-identifier and the first master key MASTER_KEY1. Specifically, the writing device 301-1 generates a first value for the ECU_D by use of the ECU-identifier of the ECU_D, i.e. ECU_ID_D, and the first master key MASTER_KEY1. As the first value, it is possible to calculate a digest regarding the ECU-identifier and the first master key MASTER_KEY1. As a digest calculating method, for example, it is possible to use a hash function or an exclusive-OR operation. Herein, the hash function is used for a method of calculating the first value. Specifically, the writing device 301-1 inputs the ECU-identifier of the ECU_D, i.e. ECU_ID_D, and the first master key MASTER_KEY1 to the hash function so as to calculate a hash value, i.e. hash(ECU_ID_D, MASTER_KEY1), as the first value of the ECU_D.

(Step S503)

The writing device 301-1 writes the first value into the ECU. Specifically, the writing device 301-1 writes the first value, i.e. hash(ECU_ID_D, MASTER_KEY1), into the ECU_D. The ECU_D having written the first value hash (ECU_ID_D, MASTER_KEY1) will be transferred to the second manufacturing factory.

(Step S504)

In the room 300-2 of the second manufacturing factory, the ECU_D is connected to the writing device 301-2. The ECU_D sends its own first value hash(ECU_ID_D, MASTER_KEY1) to the writing device 301-2.

(Step S505)

The writing device 301-2 generates an ECU-initial key using the first value and the second master key MASTER_KEY2. Specifically, the writing device 301-2 generates an ECU-initial key for the ECU_D by use of the first value of the ECU_D, i.e. hash(ECU_ID_D, MASTER_KEY1), and the second master key MASTER_KEY2. As the ECU-initial key, it is possible to calculate a digest regarding the first value and the second master key MASTER_KEY2. As a digest calculating method, for example, it is possible to use a hash function or an exclusive-OR operation. Herein, the hash function is used as the method of calculating an ECU-initial key. Specifically, the writing device 301-2 inputs the first value of the ECU_D, i.e. hash(ECU_ID_D, MASTER_KEY1), and the second master key MASTER_KEY2 to the hash function so as to calculate a hash value hash(hash(ECU_ID_D, MASTER_KEY1), MASTER_KEY2) as an ECU-initial key Key_D for the ECU_D.

(Step S506)

The writing device 301-2 writes the ECU-initial key into the ECU. Specifically, the writing device 301-2 writes the ECU-initial key Key_D into the ECU_D. The ECU_D having written the ECU-initial key Key_D will be mounted on the automobile 1001.

According to the present embodiment, it is possible to generate an ECU-initial key using an ECU-identifier for each ECU and a plurality of master keys. Thus, it is possible to improve safety for an ECU-initial key. This effect will be described below.

For example, it is possible to assume the situation that an ECU manufacturer for producing ECUs may hold the first master key MASTER_KEY1 while a manufacturer of OEM supply destination, which attaches ECUs supplied by the ECU manufacturer to automobiles as its own ECUs having company's brands, may hold the second master key MASTER_KEY2. In this situation, each of the ECU manufacturer and the manufacturer of OEM supply destination may generate an ECU-initial key using an ECU-identifier and its own single master key so as to write the ECU-initial key into the ECU. This incurs a possibility that the ECU-initial key written into each ECU may be leaked in a manufacturer when its single master key is leaked. As a result, when the first master key MASTER_KEY1 of an ECU manufacturer is leaked to the outside, there occurs a possibility that all the manufacturers of OEM supply destinations using ECUs having written ECU-initial keys by the ECU manufacturer should bear the burden of replacing the ECUs. When the second master key MASTER_KEY2 of a manufacturer of OEM supply destination is leaked to the outside, there occurs a possibility to bear the burden of replacing ECUs in all type of vehicles mounting ECUs having written ECU-initial keys by the manufacturer of OEM supply destination.

In the present embodiment, however, a plurality of master keys are used to generate ECU-initial keys; hence, it is possible to prevent leakage of ECU-initial keys unless all the master keys are leaked to the outside. In the situation that an ECU manufacturer holds the first master key MASTER_KEY1 while a manufacturer of OEM supply destination holds the second master key MASTER_KEY2, the present embodiment may use both the master keys MASTER_KEY and MASTER_KEY2 to generate an ECU-initial key, and therefore it is possible to prevent leakage of an ECU-initial key even when one of the master keys is leaked to the outside. Upon determining leakage of one master key among two master keys MASTER_KEY1 and MASTER_KEY2, it is possible to update the leaked master key with a new master key before the other master key is leaked to the outside; hence, it is possible to prevent leakage of an ECU-initial key beforehand. Even when both the master keys MASTER_KEY1 and MASTER_KEY2 are leaked to the outside, it is possible to reduce a negative impact due to the leakage to an ECU-initial key to only the ECUs ascribed to a combination of the ECU manufacturer and the manufacturer of OEM supply destination. As a result, it is possible to alleviate the burden of replacing ECUs in the ECU manufacturer and the manufacturer of OEM supply destination.

[Stage for Sharing ECU-Initial Keys]

Next, the stage for sharing ECU-initial keys will be described according to the present embodiment with reference to various examples as the method of sharing ECU-initial keys.

[Method of Sharing ECU-Initial Keys According to Example 1]

Figure 15:
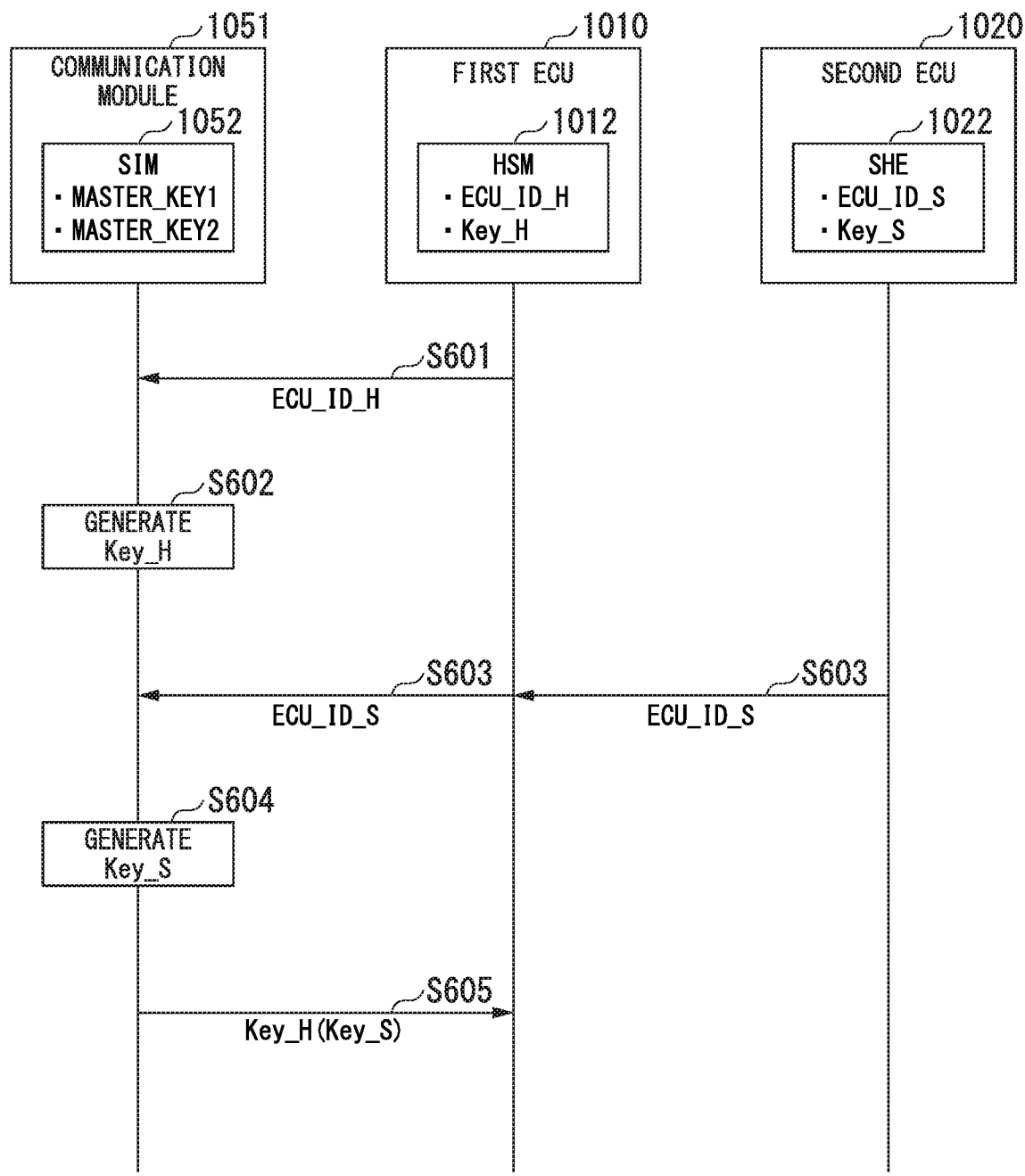
FIG. 15 is a sequence diagram showing a method of sharing an ECU-initial key (Example 1) according to the sixth embodiment.

The method of sharing ECU-initial keys according to Example 1 will be described with reference to FIG. 15. FIG. 15 is a sequence diagram showing the method of sharing ECU-initial keys (Example 1) according to the sixth embodiment. In FIG. 15, the automobile 1001 is equipped with the first ECU 1010 having written an ECU-initial key Key_H by the writing device 301-2 shown in FIG. 14 and the second ECU 1020 having written an ECU-initial key Key_S by the writing device 301-2. The first ECU 1010 has an ECU-identifier ECU_ID_H. In the first ECU 1010, the key storage media 1013 of the HSM 1012 stores the ECU-initial key Key_H. The second ECU 1020 has an ECU-identifier ECU_ID_S. In the second ECU 1020, the key storage media 1023 of the SHE 1022 stores the ECU-initial key Key_S.

In the automobile 1001, the key storage media 1053 of the SIM 1052 installed in the communication module 1051 of the TCU 1050 stores the first master key MASTER_KEY1 and the second master key MASTER_KEY2. The first master key MASTER_KEY1 and the second master key MASTER_KEY2 have been safely stored on the SIM 1052 in manufacturing. The first master key MASTER_KEY stored on the key storage media 1053 of the SIM 1052 is identical to the first master key MASTER_KEY1 owned by the writing device 301-1 shown in FIG. 14. The second master key MASTER_KEY2 stored on the key storage media 1053 of the SIM 1052 is identical to the second master key MASTER_KEY2 owned by the writing device 301-2 shown in FIG. 14. That is, the key storage media 1053 of the SIM 1052 stores the same master keys as the first master key MASTER_KEY1 and the second master key MASTER_KEY2 that are used to generate the ECU-initial key Key_H for the first ECU 1010 and the initial key Key_S for the second ECU 1020.

The following description is made in the precondition that the first ECU 1010 exchanges data with the SIM 1052 of the communication module 1051 inside the TCU 1050.

(Step S601)

The first ECU 1010 supplies its own ECU-identifier ECU_ID_H to the SIM 1052. For example, the timing of supplying the ECU-identifier would be the first power-on timing after the first ECU 1010 is mounted on the automobile 1001.

(Step S602)

The SIM 1052 generates the ECU-initial key Key_H for the first ECU 1010 by use of the ECU-identifier ECU_ID_H supplied from the first ECU 1010 as well as the first master key MASTER_KEY and the second master key MASTER_KEY2 stored on the key storage media 1053. The method of generating ECU-initial keys with the SIM 1052 is identical to the method of generating ECU-initial keys with the writing devices 301-1 and 301-2 shown in FIG. 14. The key storage media 1053 stores the initial key of Key_H for the first ECU 1010 in connection with the ECU-identifier ECU_ID_H for the first ECU 1010. This makes it possible for the SIM 1052 and the first ECU 1010 to share the ECU-initial key Key_H. For example, the shared ECU-initial key Key_H is used for the purpose of encrypting data to be exchanged between the SIM 1052 and the HSM 1012 of the first ECU 1010.

(Step S603)

The second ECU 1020 supplies its own ECU-identifier ECU_ID_S to the SIM 1052 by means of the first ECU 1010. For example, the timing of supplying the ECU-identifier would be the first power-on time after the second ECU 1020 is mounted on the automobile 1001.

(Step S604)

The SIM 1052 generates the ECU-initial key Key_S for the second ECU 1020 by use of the ECU-identifier ECU_ID_S supplied from the second ECU 1020 as well as the first master key MASTER_KEY1 and the second master key MASTER_KEY2 stored on the key storage media 1053. The method of generating ECU-initial keys with the SIM 1052 is identical to the method of generating ECU-initial keys with the writing devices 301-1 and 301-2 shown in FIG. 14.

(Step S605)

The SIM 1052 encrypts the ECU-initial key Key_S by use of the ECU-initial key Key_H for the first ECU 1010 stored on the key storage media 1053, thus generating the encrypted data Key_H(Key_S). The SIM 1052 transmits the encrypted data Key_H(Key_S) to the first ECU 1010. At this time, the SIM 1052 may transmits a pair of the encrypted data Key_H(Key_S) and the ECU-identifier ECU_ID_S for the second ECU 1020 to the first ECU 1010.

The first ECU 1010 supplies the encrypted data Key_H (Key_S) received from the SIM 1052 to the HSM 1012. The HSM 1012 decrypts the encrypted data Key_H(Key_S) by use of the ECU-initial key Key_H stored on the key storage media 1013.

Due to the decryption, it is possible to produce the ECU-initial key Key_S for the second ECU 1020. The key storage media 1013 of the HSM 1012 stores the ECU-initial key Key_S for the second ECU 1020 in connection with the ECU-identifier ECU_ID_S for the second ECU 1020. This makes it possible for the first ECU 1010 and the second ECU 1020 to share the same ECU-initial key Key_S. For example, the shared ECU-initial key Key_S is used for the purpose of encrypting data to be exchanged between the HSM 1012 of the first ECU 1010 and the SHE 1022 of the second ECU 1020.

In the first ECU 1010, it is possible to store the ECU-identifier ECU_ID_S for the second ECU 1020, which is correlated to the ECU-initial key Key_S for the second ECU 1020, at the time of transferring the ECU-identifier ECU_ID_S for the second ECU 1020 in step S603. Alternatively, it is possible to use the ECU-identifier ECU_ID_S included in a pair of the encrypted data Key_H(Key_S) and the ECU-identifier ECU_ID_S for the second ECU 1020, which are received from the SIM 1052.

In the method of sharing ECU-initial keys according to Example 1, the SIM 1052 may exemplify a key generation device. In addition, the SIM 1052 and the HSM 1012 may exemplify a key management system.

In the method of sharing ECU-initial keys according to Example 1, the SIM 1052 having the first master key MASTER_KEY1 and the second master key MASTER_KEY2 is configured to generate an ECU-initial key using the first and second master keys MASTER_KEY1 and MASTER_KEY2; but this is not a restriction. It is possible for the key storage media 1013 of the HSM 1012 of the first ECU 1010 to store the first master key MASTER_KEY1 and the second master key MASTER_KEY2, and therefore the HSM 1012 may generate an ECU-initial key using the first and second master keys MASTER_KEY1 and MASTER_KEY2. In this case, the HSM 1012 may exemplify a key generation device. In addition, the HSM 1012 may exemplify a key management system.

[Method of Sharing ECU-Initial Keys According to Example 2]

Figure 16:
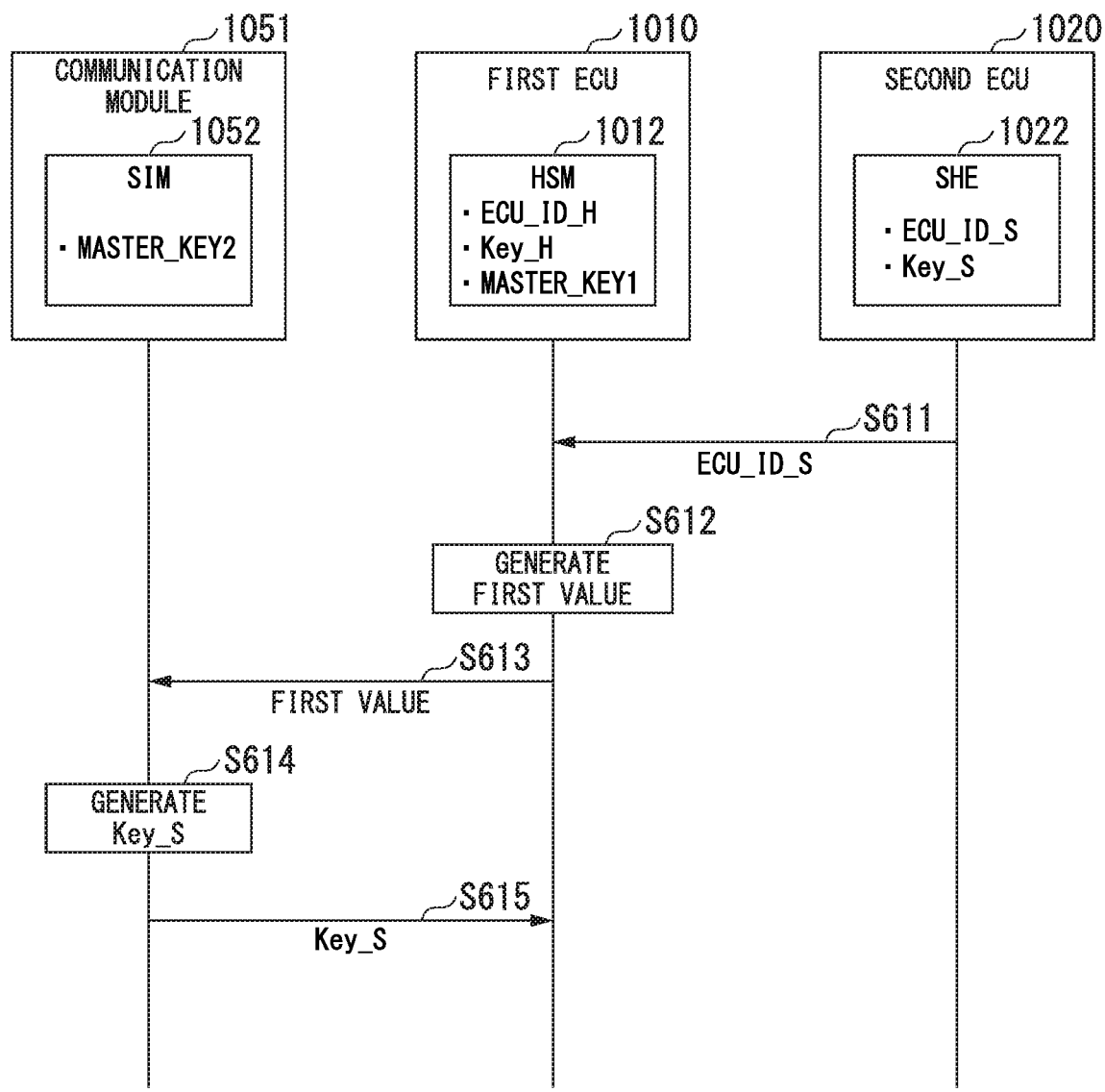
FIG. 16 is a sequence diagram showing a method of sharing an ECU-initial key (Example 2) according to the sixth embodiment.

The method of sharing ECU-initial keys according to Example 2 will be described with reference to FIG. 16. FIG. 16 is a sequence diagram showing the method of sharing ECU-initial keys (Example 2) according to the sixth embodiment.

In the method of sharing ECU-initial keys according to Example 1, both the first master key MASTER_KEY1 and the second master key MASTER_KEY2 are held by the same SIM 1052 (i.e. a secure element). In the method of sharing ECU-initial keys according to Example 2, however, the first master key MASTER_KEY1 and the second master key MASTER_KEY2 are separately held by secure elements having different specifications. Specifically, as shown in FIG. 16, the HSM 1012 of the first ECU 1010 stores the first master key MASTER_KEY1 on the key storage media 1013 while the SIM 1052 of the communication module 1051 stores the second master key MASTER_KEY2 on the key storage media 1053. The first master key MASTER_KEY1 is safely stored on the HSM 1012 in manufacture. The second master key MASTER_KEY2 is safely stored on the SIM 1052 in manufacture.

For other points other than the above point of distributed management of master keys, the SIM 1052 of the communication module 1051, the HSM 1012 of the first ECU 1010, and the SHE 1022 of the second ECU 1020 are all configured to implement the same method of sharing ECU-initial keys as shown in FIG. 15. Hereinafter, the method of sharing ECU-initial keys according to Example 2 will be described with reference to FIG. 16.

(Step S611)

The second ECU 1020 transmits its own ECU-identifier ECU_ID_S to the first ECU 1010. The timing of transmitting the ECU-identifier would be the first power-on time after the second ECU 1020 is mounted on the automobile 1001.

(Step S612)

The first ECU 1010 supplies the ECU-identifier ECU_ID_S received from the second ECU 1020 to the HSM 1012. The HSM 1012 generates a first value using the ECU-identifier ECU_ID_S and the first master key MASTER_KEY1 stored on the key storage media 1013. The method of generating a first value with the HSM 1012 is identical to the foregoing method of generating a first value with the writing device 301-1 as shown in FIG. 14.

(Step S613)

The first ECU 1010 transmits the first value generated by the HSM 1012 to the SIM 1052. At this time, the first ECU 1010 may transmit a pair of the first value and the ECU-identifier ECU_ID_S for the second ECU 1020 to the SIM 1052.

(Step S614)

The SIM 1052 generates the ECU-initial key Key_S for the second ECU 1020 by use of the first value received from the first ECU 1010 and the second master key MASTER_KEY2 stored on the key storage media 1053. The method of generating ECU-initial keys with the SIM 1052 is identical to the foregoing method of generating ECU-initial keys with the writing device 301-2 as shown in FIG. 14.

(Step S615)

The SIM 1052 transmits the ECU-initial key Key_S to the first ECU 1010. At this time, the SIM 1052 may transmits a pair of the ECU-initial key Key_S and the ECU-identifier ECU_ID_S for the second ECU 1020 to the first ECU 1010.

The first ECU 1010 supplies to the HSM 1012 the ECU-initial key Key_S for the second ECU 1020, which is received from the SIM 1052. The key storage media 1013 of the HSM 1012 stores the ECU-initial key Key_S for the second ECU 1020 in connection with the ECU-identifier ECU_ID_S for the second ECU 1020. This makes it possible for the first ECU 1010 and the second ECU 1020 to share the same ECU-initial key Key_S. For example, the shared ECU-initial key Key_S is used for the purpose of encrypting data to be exchanged between the HSM 1012 of the first ECU 1010 and the SHE 1022 of the second ECU 1020.

In the first ECU 1010, it is possible to store the ECU-identifier ECU_ID_S received from the second ECU 1020 in step S611 in connection with the ECU-initial key Key_S for the second ECU 1020. Alternatively, it is possible to use the ECU-identifier ECU_ID_S included in a pair of the ECU-initial key Key_S and the ECU-identifier ECU_ID_S for the second ECU 1020, which are received from the SIM 1052 in step S615.

In the method of sharing ECU-initial keys according to Example 2, the HSM 1012 may exemplify a first value generating device. In addition, the SIM 1052 may exemplify an initial key generating device. The HSM 1012 and the SIM 1052 may exemplify a key management system.

In the method of sharing ECU-initial keys according to Example 2, the HSM 1012 may refuse to accept the same ECU-identifier ECU_ID_S as the foregoing ECU-identifier ECU_ID_S, which has been already received for the purpose of generating a first value. For example, it is possible for the HSM 1012 to prevent further accepting the same ECU-identifier ECU_ID_S as the foregoing ECU-identifier ECU_ID_S correlated to the initial key of Key_S stored on the key storage media 1013. Thus, even when an attacker may acquire the ECU-identifier ECU_ID_S, it is impossible for him/her to wrongfully regenerate a first value by use of the HSM 1012; hence, it is possible to prevent anyone from wrongfully acquiring the first value. In addition, the SIM 1052 may prevent further accepting the same first value as the foregoing first value which has been already used for the purpose of generating the ECU-initial key Key_S. Thus, even when an attacker may acquire the first value, it is impossible for him/her to wrongfully regenerate the ECU-initial key by use of the SIM 1052; hence, it is possible to prevent anyone from wrongfully acquiring the ECU-initial key Key_S.

Method of Sharing ECU-Initial Keys According to Example 31

The method of sharing ECU-initial keys according to Example 3 will be described with reference to FIG. 17. FIG.

17 is a sequence diagram showing the method of sharing ECU-initial keys (Example 3) according to the sixth embodiment.

In the method of sharing ECU-initial keys according to Example 3 similar to the foregoing method of sharing ECU-initial keys according to Example 2, the first master key MASTER_KEY1 and the second master key MASTER_KEY2 are separately held by secure elements having different specifications. Specifically, as shown in FIG. 17, the SIM 1052 of the communication module 1051 stores the first master key MASTER_KEY1 on the key storage media 1053 while the HSM 1012 of the first ECU 1010 stores the second master key MASTER_KEY2 on the key storage media 1013. The first master key MASTER_KEY1 is safely stored on the SIM 1052 in manufacture. The second master key MASTER_KEY2 is safely stored on the HSM 1012 in manufacture. For the other points other than the point of distributed management of master keys, the SIM 1052 of the communication module 1051, the HSM 1012 of the first ECU 1010, and the SHE 1022 of the second ECU 1020 are all configured to implement the method of sharing ECU-initial keys according to Example 1 as shown in FIG. 15. Hereinafter, the method of sharing ECU-initial keys according to Example 3 will be described with reference to FIG. 17.

(Step S621)

The second ECU 1020 supplies its own ECU-identifier ECU_ID_S to the SIM 1052 via the first ECU 1010. The timing of supplying the ECU-identifier would be the first power-on time after the second ECU 1020 is mounted on the automobile 1001.

(Step S622)

The SIM 1052 generates a first value using the ECU-identifier ECU_ID_S given by the second ECU 1020 and the first master key MASTER_KEY1 stored on the key storage media 1053. The method of generating a first value with the ISM 1052 is identical to the foregoing method of generating a first value with the writing device 301-1 shown in FIG. 14.

(Step S623)

The SIM 1052 transmits the first value to the first ECU 1010. At this time, the SIM 1052 may transmit a pair of the first value and the ECU-identifier ECU_ID_S for the second ECU 1020 to the first ECU 1010.

(Step S624)

The first ECU 1010 supplies the first value received from the SIM 1052 to the HSM 1012. The HSM 1012 generates the ECU-initial key Key_S for the second ECU 1020 by use of the first value and the second master key MASTER_KEY2 stored on the key storage media 1013. The method of generating ECU-initial keys with the HSM 1012 is identical to the foregoing method of generating ECU-initial keys with the writing device 301-2 shown in FIG. 14.

The key storage media 1013 of the HSM 1012 stores the ECU-initial key Key_S for the second ECU 1020 in connection with the ECU-identifier ECU_ID_S for the second ECU 1020. This makes it possible for the first ECU 1010 and the second ECU 1020 to share the same ECU-initial key Key_S. For example, the shared ECU-initial key is used for the purpose of encrypting data to be exchanged between the HSM 1012 of the first ECU 1010 and the SHE 1022 of the second ECU 1020.

In the first ECU 1010, it is possible to store the ECU-identifier ECU_ID_S for the second ECU 1020 when being transferred in step S621 as the ECU-identifier ECU_ID_S correlated to the ECU-initial key Key_S for the second ECU 1020. Alternatively, it is possible to use the ECU-identifier ECU_ID_S included in a pair of the first value and the ECU-identifier ECU_ID_S for the second ECU 1020, which is received from the SIM 1052 in step S623.

In the method of haring ECU-initial keys according to Example 3, the SIM 1052 may exemplify a first value generating device. In addition, the HSM 1012 may exemplify an initial key generating device. The SIM 1052 and the HSM 1012 may exemplify a key management system.

In the method of sharing ECU-initial keys according to Example 3, the SIM 1052 may refuse to further accept the same ECU-identifier ECU_ID_S as the foregoing ECU-identifier ECU_ID_S which has been received for the purpose of generating a first value. Thus, even when an attacker may acquire the ECU-identifier ECU_ID_S, it is impossible for him/her to wrongfully regenerate the first value by use of the SIM 1052; hence, it is possible to prevent wrongfully acquiring the first value.

The HSM 1012 may refuse to accept the same ECU-identifier ECU_ID_S as the foregoing ECU-identifier ECU_ID_S, which has been already received to be supplied to the SIM 1052. For example, the HSM 1012 may refuse to accept the same ECU-identifier ECU_ID_S as the ECU-identifier ECU_ID_S correlated to the ECU-initial key Key_S stored on the key storage media 1013. Thus, even when an attacker may acquire the ECU-identifier ECU_ID_S, it is possible for him/her to wrongfully regenerate the first value by supplying the ECU-identifier ECU_ID_S to the SIM 1052 via the HSM 1012; hence, it is possible to prevent wrongfully acquiring the first value.

The HSM 1012 may refuse to accept the same first value as the first value which has been already used to generate the initial value of ECU Key_S. Thus, even when an attacker may acquire the first value, it is impossible to wrongfully the ECU-initial key Key_S by use of the HSM 1012; hence, it is possible to prevent wrongfully acquiring the ECU-initial key Key_S.

In the methods of sharing ECU-initial keys according to Example 2 and Example 3, the first master key MASTER_KEY1 and the second master key MASTER_KEY2 are separately held by different secure elements on the automobile 1001. Compared to the situation that both the first and second master keys MASTER_KEY1 and MASTER_KEY2 are concurrently held by the same secure element, it is possible to improve safety of saving master keys since the first and second master keys MASTER_KEY1 and MASTER_KEY2 are held in a dispersive manner.

In the methods of sharing ECU-initial keys according to Example 2 and Example 3, the first master key MASTER_KEY1 and the second master key MASTER_KEY2 are separately held by secure elements having different specifications on the automobile 1001. Compared to the situation that the first and second master keys MASTER_KEY1 and MASTER_KEY2 are separately held by secure elements having the same specification, it is possible to improve safety of saving master keys. This effect will be discussed below.

In the situation that the first and second master keys MASTER_KEY1 and MASTER_KEY2 are separately held by different secure elements having the same specification, it is likely for someone to successfully analyze one secure element so that one master key, e.g. the first master key MASTER_KEY1, will be leaked to the outside. Using the same analysis method, it is likely for someone to successfully analyze another secure element having the same specification so that another master key, e.g. the second master key MASTER_KEY2, will be leaked to the outside.

In contrast, the first master key MASTER_KEY1 and the second master key MASTER_KEY2 are separately held by secure elements having different specifications in the methods of sharing ECU-initial keys according to Example 2 and Example 3. Thus, even when someone may successfully analyze one secure element having one specification so that one master key, e.g. the first master key MASTER_KEY1, will be leaked to the outside, the same analysis method may fail to analyze another secure element having another specification; hence, it is possible to prevent another master key, e.g. the second master key MASTER_KEY2, from being leaked to the outside. Thus, it is possible to further improve the safety of saving ECU-initial keys.

Figure 17:
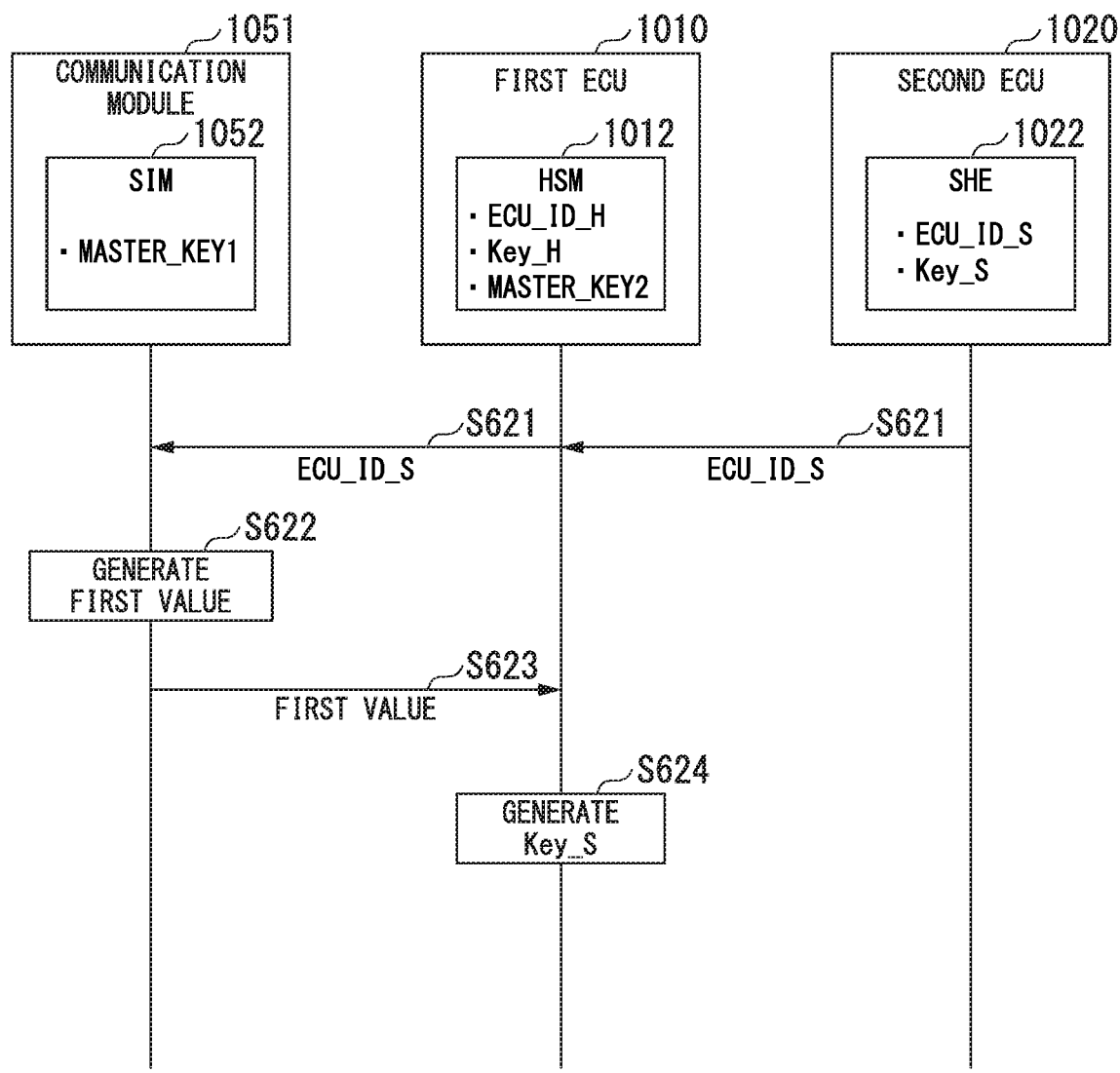
FIG. 17 is a sequence diagram showing a method of sharing an ECU-initial key (Example 3) according to the sixth embodiment.

In the method of sharing ECU-initial keys according to Example 2 shown in FIG. 16 and the method of sharing ECU-initial keys according to Example 3 shown in FIG. 17, the SIM and the HSM are used as the secure elements for separately saving the first and second mater keys MASTER_KEY1 and MASTER_KEY2. Herein, the SIM and the HSM have different specifications. Specifically, the SIM and the HSM are ascribed to different technological specifications in terms of tamper resistance. As the technology for tamper resistance, for example, it is possible to mention a hardware technology for information protection. As the technology for information protection, for example, it is possible to mention a technology of deleting information inside each secure element by implementing a physical or electrical analysis method for each secure element, a technology of destroying the internal circuitry of each secure element, or a technology of suspending the operation of each secure element. As the hardware technology for information protection, it is possible to mention a technology of making it difficult to analyze each secure element by measuring electromagnetic waves leaked from each secure element.

In the present embodiment, a plurality of secure elements having different specifications are used to dispersively save a plurality of master keys. As a plurality of secure elements for dispersively saving a plurality of master keys, it is possible to use a plurality of secure elements having different specifications in terms of tamper resistance. As secure elements, it is possible to mention SIM, eSIM serving as one type of SIM, HSM, TPM, and SHE.

First Variation of Sixth Embodiment

The sixth embodiment is designed such that the automobile 1001 generates ECU-initial keys therein. Similar to the second embodiment, however, it is possible to generate ECU-initial keys by management server equipment outside an automobile.

The management server equipment outside an automobile may save a plurality of master keys. The automobile wirelessly transmits an ECU-identifier for each ECU mounted thereon to the management server equipment. The management server equipment generates an ECU-initial key using the ECU-identifier for each ECU and a plurality of master keys saved therein, thus wirelessly transmitting the ECU-initial key to the automobile.

Second Variation of Sixth Embodiment

It is possible to dispersively save a plurality of master keys in a secure element inside an automobile, e.g. an SIM, and management server equipment outside an automobile. One of the SIM and the management server equipment may generate a first value using its own master key and an ECU-identifier for each ECU mounted on an automobile, thus wirelessly transmitting the first value to the other of the SIM and the management server equipment. The other of the SIM and the management server equipment is generates an ECU-initial key for each ECU by use of its own master key and the first value. When the management server equipment stands for the other of the SIM and the management server equipment, the management server equipment wirelessly transmits the ECU-initial key to the automobile.

Third Variation of Sixth Embodiment

Figure 18:
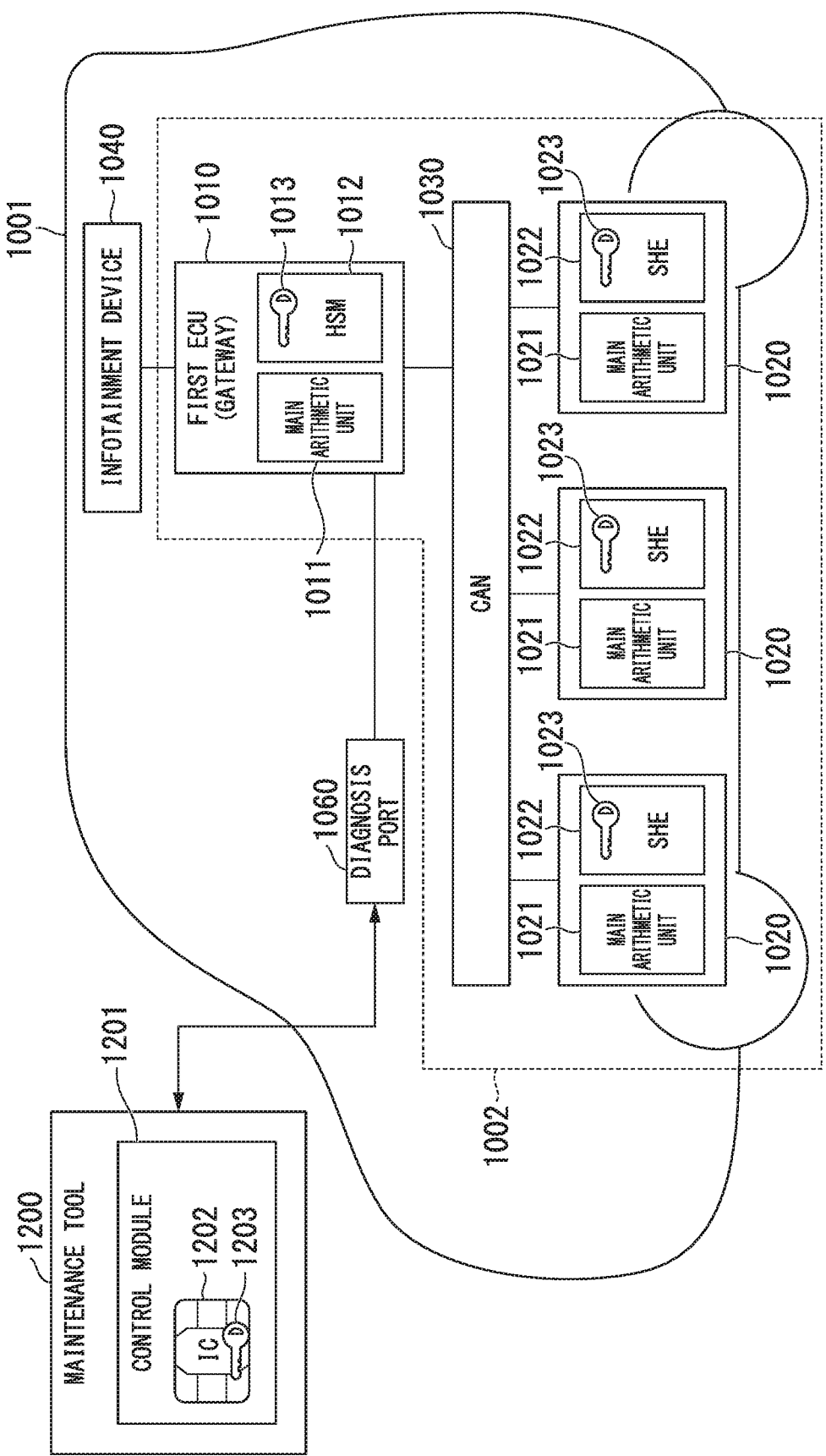
FIG. 18 is a block diagram showing a variation of the automobile according to the sixth embodiment.

FIG. 18 is a block diagram showing a variation of the automobile 1001 according to the sixth embodiment. In FIG. 18, the parts equivalent to those of FIG. 13 will be denoted using the same reference signs; hence, their descriptions will be omitted here. In the variation shown in FIG. 18, a maintenance tool 1200 is connectible to the diagnosis port 1060. The first ECU 1010 connected to the diagnosis port 1060 may exchange data with the maintenance tool 1200 through the diagnosis port 1060. The maintenance tool 1200 may have the function of the conventional diagnosis terminal connected to the OBD port.

The maintenance tool 1200 includes a control module 1201. The control module 1201 includes an IC (Integrated Circuit) chip 1202. The IC chip 1202 has a key storage media 1203 for storing keys. The IC chip 1202 has tamper resistance. The IC chip 1202 is an example of a secure element. The IC chip 1202 is one type of computer, which achieve desired functions according to computer programs.

In the variation shown in FIG. 18, the IC chip 1202 may correspond to the SIM 1052 shown in FIG. 13 while the key storage media 1203 may correspond to the key storage media 1053 shown in FIG. 13. In the variation shown in FIG. 18, the IC chip 1202 is substituted for the SIM 1052 while the key storage media 1023 is substituted for the key storage media 1053 in the method of sharing ECU-initial keys according to Example 1 shown in FIG. 15, in the method of sharing ECU-initial keys according to Example 2 shown in FIG. 16, and in the method of sharing ECU-initial keys according to Example 3 shown in FIG. 17.

The foregoing embodiments refer to an automobile as an example of a vehicle; but they are applicable to other types of vehicles other than automobiles such as motorcycles having engines and railway vehicles.

It is possible to store on computer-readable storage media computer the programs for achieving various steps of the management method executed by the management device 10 or 10a or the computer programs for achieving various steps executed by the foregoing devices, and therefore those programs stored on storage media may be loaded into computer systems and then executed by computer systems. Herein, the term "computer system" may embrace OS and hardware such as peripheral devices.

In addition, the term "computer-readable storage media" may refer to flexible disks, magneto-optical disks, ROM, rewritable nonvolatile memory such as flash memory, portable media such as DVD (Digital Versatile Disk), and storage devices such as hard disks embedded in computer systems.

Moreover, the term "computer-readable storage media" may embrace any measures for temporarily holding programs such as nonvolatile memory (e.g. DRAM (Dynamic Random Access Memory)) inside computer systems serving as servers and clients, to which programs are transmitted through networks like the Internet or communication lines like telephone lines.

The foregoing programs may be transmitted from computer systems having stored programs on storage devices to other computer systems by way of transmission media or by way of transmission waves propagating through transmission media. Herein, the term "transmission media" for transmitting programs refers to any media having functions to transmit information such as networks (communication networks) like the Internet and communication lines like telephone lines.

The foregoing programs may achieve part of the foregoing functions.

In addition, the foregoing programs may be differential files (or differential programs) which can be combined with pre-installed programs of computer systems so as to achieve the foregoing functions.

REFERENCE SIGNS LIST 1, 1001: automobile
2: wireless communication network
3: wireless communication
4: communication line
10, 10a: management device
11: controller
12: CAN interface
13: wireless communication part
20: secure element
20a, 1052: SIM (secure element)
21: key generation part
22, 1013, 1023, 1053, 1203: key storage media
23: verification part
24: encryption processor
31: master key storing part
32: ECU initial key storing part
80: management server equipment
1002: on-board computer system
1010: first ECU
1011, 1021: main arithmetic unit
1012: HSM
1020: second ECU
1022: SHE
1030: CAN
1040: infotainment device
1050: TCU
1051: communication module
1060: diagnosis port
1200: maintenance tool
1201: control module
1202: IC chip

The invention claimed is:

1. A management device including a secure element configured to communicate with a plurality of on-board computers, each of which is configured to store an identifier and a corresponding initial key in advance, via a communication interface in a vehicle, the management device comprising:
a key storage configured to store a master key; and
a key generator configured to generate the initial key of the on-board computer among the plurality of on-board computers by use of the master key and the identifier of the on-board computer, which is received from the on-board computer via the communication interface,
wherein the key storage is configured to store the initial key of the on-board computer in association with the identifier of the on-board computer, thus causing the secure element to share the initial key with the on-board computer.

2. A management system, comprising: a management server equipment and a management device configured to communicate with a plurality of on-board computers, each of which is configured to store an identifier and a corresponding initial key in advance, via a communication interface in a vehicle, wherein the management server equipment includes a storage medium configured to store a master key, and a key generator configured to generate the initial key of the on-board computer among the plurality of on-board computers by use of the master key and the identifier of the on-board computer that is received via the management device through a wireless communication network, wherein the management device comprises a secure element to implement: (i) transmitting the identifier of the on-board computer to the management server equipment through the wireless communication network; (ii) receiving a pair of the initial key of the on-board computer and the identifier of the on-board computer from the management server equipment through the wireless communication network; and (iii) storing on a key storage the initial key of the on-board computer in association with the identifier on the on-board computer, thus causing the secure element to share the initial key with the on-board computer.

3. A management device configured to communicate with a plurality of on-board computers, each of which is configured to store an identifier and a corresponding initial key in advance, is a communication interface in a vehicle, the management device comprising:
a secure element to implement
(i) transmitting the identifier of the on-board computer among the plurality of on-board computers to a management server equipment through a wireless communication network;
(ii) receiving the initial key of the on-board computer from the management server equipment through the wireless communication network, wherein the initial key of the on-board computer is generated using the identifier of the on-board computer and a master key; and
(iii) storing on a key storage the initial key of the on-board computer in association with the identifier of the on-board computer, thus causing the secure element to share the initial key with the on-board computer.

4. A management method adapted to a management device including a secure element configured to communicate with a plurality of on-board computers, each of which is configured to store an identifier and a corresponding initial key in advance, via a communication interface in a vehicle, comprising:
storing a master key; receiving the identifier of the on-board computer among the plurality of on-board computers through the communication interface; generating the initial key of the on-board computer by use of the master key and the identifier of the on-board computer; and storing the initial key of the on-board computer in association with the identifier of the on-board computer, thus causing the secure element to share the initial key with the on-board computer.

5. A management method adapted to a management system including a management server equipment and a management device configured to communicate with the management server equipment through a wireless communication network and including a secure element configured to communicate with a plurality of on-board computers, each of which is configured to store an identifier and a corresponding initial key in advance, via a communication interface in a vehicle, the management method comprising:
storing a master key with the management server equipment;

receiving, via the management server equipment, the identifier of the on-board computer from the management device;

generating, via the management server equipment, the initial key of the on-board computer among the plurality of on-board computers by use of the master key and the identifier of the on-board computer;

transmitting, via the management server equipment, to the management device the initial key of the on-board computer together with the identifier of the on-board computer;

receiving, via the management device, from the management server equipment through the wireless communication network the initial key of the on-board computer and the identifier of the on-board computer; and storing, via the management device, the initial key of the on-board computer in association with the identifier of the on-board computer, thus causing the secure element to share the initial key with the on-board computer.

6. A non-transitory computer-readable storage medium having a stored computer program causing a computer of a management device including a secure element configured to communicate with a plurality of on-board computers, each of which is configured to store an identifier and a corresponding initial key in advance, via a communication interface in a vehicle, thus implementing: storing a master key; receiving the identifier of the on-board computer among the plurality of on-board computers; generating the initial key of the on-board computer among the plurality of on-board computers by use of the master key and the identifier of the on-board computer; and storing the initial key of the on-board computer in association with the identifier of the on-board computer, thus causing the secure element to share the initial key with the on-board computer.

7. A non-transitory computer-readable storage medium having a stored computer program causing a computer of a management server equipment configured to communicate with a management device including a secure element configured to communicate with a plurality of on-board computers, each of which is configured to store an identifier and a corresponding initial key in advance, via a communication network in a vehicle, through a wireless communication network, thus implementing:

storing a master key;

receiving the identifier of the on-board computer among the plurality of onboard computers from the management device through the wireless communication network;

generating the initial key of the on-board computer among the plurality of on-board computers by use of the master key and the identifier of the on-board computer; and transmitting to the management device the initial key of the on-board computer in association with the identifier of the on-board computer, thus causing the secure element to share the initial key with the on-board computer.

8. A non-transitory computer-readable storage medium having a stored computer program causing a computer of a management device including a secure element, configured to communicate with a plurality of on-board computers, each of which is configured to store an identifier and a corresponding initial key in advance via a communication interface in a vehicle, thus implementing:

transmitting the identifier of the on-board computer among the plurality of on-board computers to a management server equipment through a wireless communication network, in which the management server equipment is configured to generate an initial key of the on-board computer using a master key and the identifier of the on-board computer;

receiving, from the management server equipment through the wireless communication network, the initial key of the on-board computer, and the identifier of the on-board computer; and storing the initial key of the on-board computer in association with the identifier of the on-board computer, thus causing the secure element to share the initial key with the on-board computer.

\* \* \* \* \*

UNITED STATES PATENT AND TRADEMARK OFFICE
CERTIFICATE OF CORRECTION

| | |
|---|---|
| PATENT NO. | : 11,201,736 B2 |
| APPLICATION NO. | : 15/747992 |
| DATED | : December 14, 2021 |
| INVENTOR(S) | : Keisuke Takemori et al. |

It is certified that error appears in the above-identified patent and that said Letters Patent is hereby corrected as shown below:

On the Title Page

On Page 2, Item (56) Other Publications (Line 17), the incorrect term "Repor" should correctly read -- Report --.

In the Claims

At Column 32, Line 24 (Claim 3), the incorrect term "is" should correctly read -- via --.

Signed and Sealed this
Thirty-first Day of May, 2022

Katherine Kelly Vidal
*Director of the United States Patent and Trademark Office*